United States Patent
Yamamoto et al.

(10) Patent No.: US 7,275,456 B2
(45) Date of Patent: Oct. 2, 2007

(54) METHOD OF PRODUCTION RACK GUIDE BASE BODY IN RACK-AND-PINION TYPE STEERING DEVICE AND RACK GUIDE

(75) Inventors: Kazuhiro Yamamoto, Shiga (JP); Masahiko Hirose, Osaka (JP); Katsutoshi Nishimura, Osaka (JP); Masao Shimura, Osaka (JP); Yoshiro Kuzumi, Kanagawa (JP)

(73) Assignees: Oiles Corporation, Tokyo (JP); Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/534,413

(22) PCT Filed: Nov. 14, 2003

(86) PCT No.: PCT/JP03/14523

§ 371 (c)(1),
(2), (4) Date: Aug. 9, 2005

(87) PCT Pub. No.: WO2004/045790

PCT Pub. Date: Jun. 3, 2004

(65) Prior Publication Data

US 2006/0042849 A1    Mar. 2, 2006

(30) Foreign Application Priority Data

Nov. 18, 2002  (JP) ............................. 2002-334287

(51) Int. Cl.
*F16H 1/04* (2006.01)

(52) U.S. Cl. ....................................................... 74/422

(58) Field of Classification Search ................. 74/409, 74/422, 492; 180/427; 280/267
See application file for complete search history.

(56) References Cited

U.S. PATENT DOCUMENTS

| | | | |
|---|---|---|---|
| 5,682,959 A * | 11/1997 | Joerg et al. .................. 180/428 |
| 5,746,285 A * | 5/1998 | Yonezawa ..................... 74/498 |
| 6,076,417 A * | 6/2000 | Engler .................... 74/388 PS |
| 6,178,843 B1 | 1/2001 | Machida et al. |
| 6,539,821 B2 * | 4/2003 | Bugosh ........................ 74/422 |

(Continued)

FOREIGN PATENT DOCUMENTS

DE    100 14 336 A1    10/2001

(Continued)

OTHER PUBLICATIONS

International Search Report for PCT/JP03/14523 dated Apr. 6, 2004.
European Search Report mailed Dec. 4, 2006.

*Primary Examiner*—Vicky A. Johnson
(74) *Attorney, Agent, or Firm*—Nixon & Vanderhye P.C.

(57) ABSTRACT

A rack guide includes a rack guide base body which has on its outer peripheral surface a pair of semicylindrical surfaces and a pair of planar surfaces each located between the pair of semicylindrical surfaces, has a concavely recessed surface located on one axial end portion side inwardly of the pair of semicylindrical surfaces and the planar surfaces, and has a cylindrical surface located on the other axial end portion side inwardly of the pair of semicylindrical surfaces and the planar surfaces; and a slider secured to the rack guide base body.

11 Claims, 16 Drawing Sheets

U.S. PATENT DOCUMENTS 6,619,420 B1 * 9/2003 Saarinen .................... 180/428
6,921,096 B2 * 7/2005 Yang ..................... 280/93.514
2002/0124670 A1 9/2002 Bugosh

FOREIGN PATENT DOCUMENTS

| EP | 1 086 880 A2 | 3/2001 |
| JP | 6-239245 | 8/1994 |
| JP | 7-323850 | 12/1995 |
| JP | 8-133099 | 5/1996 |
| JP | 11-268657 | * 10/1999 |
| JP | 2000-142428 | 5/2000 |
| JP | 2005-47301 | 2/2005 |

* cited by examiner

F I G. 18
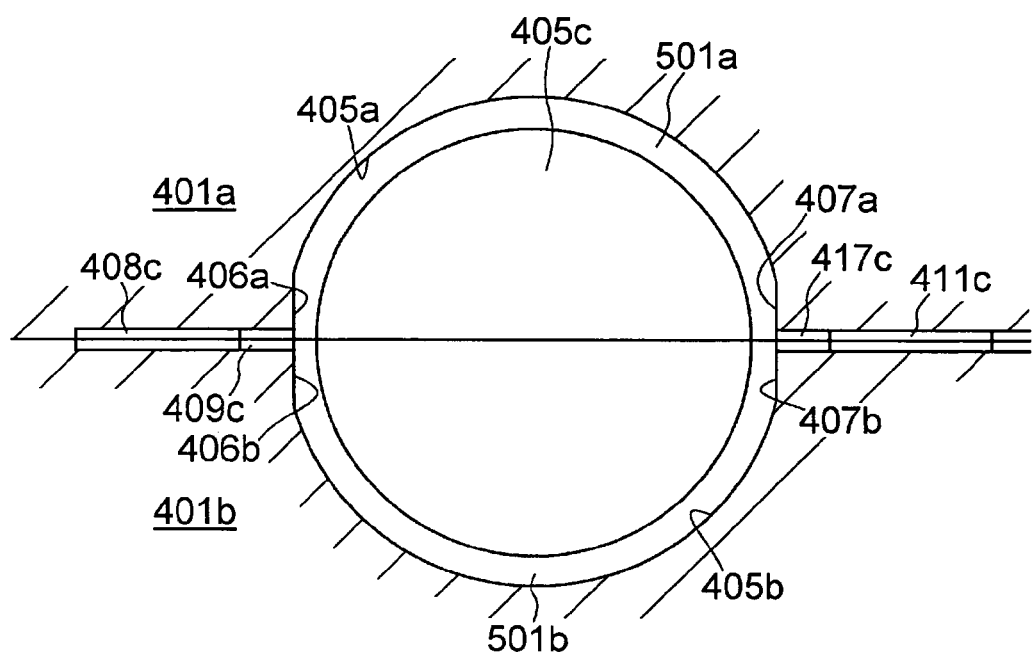

METHOD OF PRODUCTION RACK GUIDE BASE BODY IN RACK-AND-PINION TYPE STEERING DEVICE AND RACK GUIDE

This application is the U.S. national phase of international application PCT/JP2003/014523 filed 18 Nov. 2003 which designated the U.S. and claims benefit of JP 2002-334287, filed 18 Nov. 2002, the entire contents of each of which are hereby incorporated by reference.

TECHNICAL FIELD

The present invention relates to a rack-and-pinion type steering apparatus.

BACKGROUND ART

A rack-and-pinion type steering apparatus is generally comprised of a housing, a pinion rotatably supported by this housing, a rack bar on which rack teeth meshing with this pinion are formed, a rack guide disposed in a housing to slidably support the rack bar, and a spring for pressing this rack guide toward the rack bar.

In such a rack-and-pinion type steering apparatus, an iron-based sintered metal or a synthetic resin is used for the rack guide for slidably supporting the rack bar. However, in the case of the rack guide formed of an iron-based sintered metal, although it has sufficient mechanical strength against an impact load from the rack bar, the efficiency of a steering system declines since the frictional resistance to sliding is large, so that a problem remains in controllability. Meanwhile, as for the rack guide formed of a simple substance of synthetic resin, although it is conversely capable of reducing the frictional resistance to sliding, the following problems are encountered among others: It is inferior in mechanical strength against an impact load. It undergoes variations in dimensions due to such as die shrinkage, and it is difficult to effect molding with high dimensional accuracy and maintain the dimensional accuracy after molding. Furthermore, after it is built into the housing, it is subjected to the effect of the temperature rise of the steering apparatus and undergoes thermal expansion and shrinkage, which causes thermal deformation and creep, making it difficult to slidingly support the rack bar smoothly.

In the rack guide formed of a simple substance of synthetic resin, techniques have been proposed in which a reinforcing material constituted by a core bar is insert molded or embedded in a main body made of a synthetic resin particularly for the purpose of improving the mechanical strength against an impact load (disclosed in JP-UM-B-59-8932 and JP-UM-A-58-139275). However, with these techniques as well, the problem of the dimensional accuracy attributable to the die shrinkage of the synthetic resin and problems such as the thermal expansion, shrinkage, thermal deformation, and creep (plastic flow) of the synthetic resin ascribable to the temperature rise of the steering apparatus still remain unresolved.

As rack guides which overcome the above-described problems, rack guides have been proposed in which a slider made of a synthetic resin having self-lubricating properties and abrasion resistance on its sliding surface side for slidingly supporting the rack bar, or a slider made of a multi-layered material of a three-layered structure consisting of a steel sheet, a metal sintered layer deposited integrally on this steel sheet, and a synthetic resin layer impregnating and coated on this sintered layer, is combined with a rack guide base body formed of a metal such as a sintered metal or a synthetic resin containing a reinforcing filler (disclosed in JP-A-50-102027, JP-UM-B-1-27495 and JP-UM-B-2-46452).

In comparison with the rack guide mentioned before, the above-described rack guide formed by the combination of the slider and the rack guide base body has advantages in that the mechanical strength is enhanced, and that the frictional resistance to sliding is reduced.

In the rack guide formed by the combination of the slider and the rack guide base body having the above-described advantages, particularly in a case where aluminum or an aluminum alloy is used for the rack guide base body, a problem in its manufacture has been presented. Namely, in the case where the rack guide base body is fabricated from aluminum or an aluminum alloy, the die casting process is generally adopted. According to this die casting process, molten metal of aluminum or an aluminum alloy is passed through a runner channel from a gate and is forced into a cavity formed in the shape of the rack guide base body. At that time, however, the formation of runners at the junction between the runner channel and the cavity and the junction between the cavity and an overflow well is made inevitable. Then, as these runners are cut off, the rack guide base body is formed.

Incidentally, since the gap between the rack guide with a circular cross section and the cylindrical housing of the rack-and-pinion type steering apparatus in which the rack guide is disposed is set to be 1 to 20 µm, even after the aforementioned runners are cut off, the presence of projecting portions as cut remnants of the gate is made inevitable on the outer peripheral surface of the rack guide base body. Accordingly, with the rack guide base body on the outer peripheral surface of which the projecting portions remain, there is a problem in that unless the entire outer peripheral surface of the base body is subjected to machining, the rack guide cannot be disposed in the cylindrical housing. This constitutes a factor leading to higher cost due to the machining of the entire surface. The same holds true of a case where zinc or a zinc alloy is used as the molten metal.

DISCLOSURE OF THE INVENTION

The present invention has been devised in view of the above-described problems, and its object is to provide a method of manufacturing a rack guide base body which is made of aluminum or zinc, or an aluminum alloy or a zinc alloy, and which makes it unnecessary to provide any machining for its outer peripheral surface in the rack guide consisting of a combination of the rack guide base body and the slider, as well as a rack guide using the rack guide base body obtained by that method.

In accordance with a first aspect of the invention, a method of manufacturing a rack guide base body in a rack guide consisting of a rack guide base body for use in a rack-and-pinion type steering apparatus and a slider secured to the rack guide base body, is characterized by comprising the steps of: forming in a die a cavity having a pair of semicylindrical convex surfaces and a pair of planar surfaces each located between the pair of semicylindrical convex surfaces, having a recessed surface located on one axial end portion side inwardly of the pair of semicylindrical convex surfaces and the planar surfaces, and having a cylindrical surface located on another axial end portion side inwardly of the pair of semicylindrical convex surfaces and the planar surfaces; forming runner channels for respectively allowing the cavity to communicate with a gate at one planar surface and with an overflow well at another planar surface; die casting the rack guide base body by forcing molten metal of aluminum or zinc, or an aluminum alloy or a zinc alloy, from the gate into the cavity; and cutting off runners formed by the respective planar surfaces and integrally joined to the planar surfaces of the rack guide base body.

In accordance with the method of manufacturing a rack guide base body according to the first aspect, a pair of planar surfaces are formed on the outer peripheral surface of the die-cast rack guide base body, while the outer peripheral surface excluding these planar surfaces is formed into cylindrical surfaces. Therefore, as the runners joined integrally to the respective planar surfaces are cut off at positions which do not project from a phantom circle defined by the semicylindrical surfaces, the cut remnants of the runners do not project from the phantom circle defined by the semicylindrical surfaces. Accordingly, even if the gap which is set between the outer peripheral surface of the rack guide and an inner peripheral surface of a cylindrical housing in which the rack guide base body is disposed is extremely small on the order of 1 to 20 µm, it is unnecessary to effect machining for the entire outer peripheral surface of the rack guide base body. Since the rack guide base body can be disposed as die cast, it is possible to substantially reduce the cost required for machining the entire outer peripheral surface of the rack guide base body. As a result, this permits a reduction in the manufacturing cost of the rack guide.

The method of manufacturing a rack guide base body in accordance with a second aspect of the invention is characterized in that, in the manufacturing method according to the first aspect, the cavity is formed so as to have a circular arc-shaped recessed surface.

In accordance with the manufacturing method according to the second aspect, it is possible to manufacture the rack guide base body which has a circular arc-shaped recessed surface. As a result, as a circular arc-shaped slider corresponding to such a recessed surface is secured to that circular arc-shaped recessed surface, a rack bar with a circular cross-sectional shape can be slidingly supported by means of the slider.

The method of manufacturing a rack guide base body in accordance with a third aspect of the invention is characterized in that, in the manufacturing method according to the first aspect, the cavity is formed so as to have a recessed surface including a pair of mutually opposing planar surfaces and a pair of inclined surfaces respectively extending integrally from the pair of planar surfaces.

In accordance with the manufacturing method according to the third aspect, it is possible to manufacture the rack guide base body which has a recessed surface including the pair of mutually opposing planar surfaces and the pair of inclined surfaces respectively extending integrally from the pair of planar surfaces. As a result, as a slider corresponding to such planar surfaces and inclined surfaces is secured to the pair of planar surfaces and the pair of inclined surfaces, the rack bar having the inclined surfaces can be slidingly supported by means of the slider.

The method of manufacturing a rack guide base body in accordance with a fourth aspect of the invention is characterized in that, in the manufacturing method according to any one of the first to third aspects, the cavity is formed so as to be further provided with a small-diameter cylindrical surface connected at one end to a center of a bottom of the recessed surface, located inwardly of the pair of semicylindrical convex surfaces and the planar surfaces, and having a diameter smaller than that of the cylindrical surface. The method of manufacturing a rack guide base body in accordance with a fifth aspect of the invention is characterized in that, in the manufacturing method according to the fourth aspect, the cavity is formed so as to be further provided with an annular surface connected at its inner peripheral end to another end of the small-diameter cylindrical surface and connected at its outer peripheral end to one end of the cylindrical surface.

In accordance with the manufacturing methods according to these fourth and fifth aspects, it is possible to manufacture the rack guide base body which has a hole in the center of the bottom of the recessed surface. As a result, by using a slider having a projecting portion which fits in such a hole, the slider can be reliably fixed to the recessed surface. The hole to be formed may be a through hole or a hole with a bottom instead of it.

The method of manufacturing a rack guide base body in accordance with a sixth aspect of the invention is characterized in that, in the manufacturing method according to any one of the first to fifth aspects, the cavity is formed so as to have a pair of planar surfaces connected to respective ends of a bottom of the recessed surface and opposed to each other.

In accordance with the manufacturing method according to the sixth aspect, a surplus portion of molten metal of aluminum or zinc, or an aluminum alloy or a zinc alloy (hereafter referred to "aluminum or the like"), which has been injected from one planar surface side can be discharged from the other planar surface side opposing the one planar surface, so that the molten metal can be filled uniformly into the cavity. As a result, it is possible to prevent the occurrence of porosity, surface defects, and the like. Moreover, as a result of the fact that it is possible to manufacture the rack guide base body in which the pair of planar surfaces are connected to respective ends of the bottom of the recessed surface and are opposed to each other, as compared with a case where the pair of planar surfaces are connected to apex portions of the recessed surface, it becomes possible to provide a rack guide whose movement is smoothly guided by the cylindrical housing of the rack-and-pinion type steering apparatus.

The method of manufacturing a rack guide base body in accordance with a seventh aspect of the invention is characterized in that the cavity is formed so as to have at least one row of semi-annular recessed portions communicating with each other and provided in respective ones of the pair of semicylindrical convex surfaces and the pair of planar surfaces. The method of manufacturing a rack guide base body in accordance with an eighth aspect of the invention is characterized in that the cavity is formed so as to have at least two rows of semi-annular recessed portions communicating with each other and provided in respective ones of the pair of semicylindrical convex surfaces and the pair of planar surfaces.

The method of manufacturing a rack guide base body in accordance with a ninth aspect of the invention is characterized in that semi-annular recessed portions are provided in the respective ones of the pair of semicylindrical convex surfaces and the pair of planar surfaces which are located at positions offset in an axial direction from the recessed surface toward a side of the cylindrical surface.

In accordance with the manufacturing method according to the seventh, eighth, or ninth aspect, it is possible to manufacture the rack guide base body having an annular groove in the outer peripheral surface consisting of the pair of semicylindrical surfaces and the pair of planar surfaces. As a result, by fitting an elastic ring in such an annular groove, it is possible to produce a gap which is maintained by the elastic ring between the rack guide base body and the cylindrical housing in which the rack guide base body is fitted. Thus, it is possible to prevent a so-called "metal of similar composition" which is likely to occur between the two members of the rack guide base body and the cylindrical housing as metals of similar metals are brought into sliding contact with each other. Further, it is possible to overcome the problem that the movement of the rack guide toward the rack bar is hampered by an increase in the frictional resistance and the occurrence of adhesive wear accompanying such a "metal of similar composition." Consequently, it becomes possible to allow the movement of the rack guide with respect to the rack bar to be effected smoothly. Preferably, as in the manufacturing method according to the eighth aspect, the rack guide base body having two rows of annular grooves in the outer peripheral surface is manufactured by forming the cavity having at least two rows of semi-annular recessed portions, and by fitting elastic rings respectively in these two rows of annular grooves, it is possible to prevent the swinging movement of the rack guide base body in the cylindrical housing, in addition to the above-described advantages.

The method of manufacturing a rack guide base body in accordance with a 10th aspect of the invention is characterized in that runner channels are formed for allowing the cavity to communicate with the gate in a plurality of portions of the one planar surface separated with respect to the axial direction by the semi-annular recessed portions and communicate in the other planar surface with the overflow well at a plurality of portions separated with respect to the axial direction by the semi-annular recessed portions.

In accordance with the manufacturing method according to the 10th aspect, the molten metal of aluminum or the like can be filled uniformly into the cavity, with the result that it is possible to prevent the occurrence of porosity, surface defects, and the like.

The method of manufacturing a rack guide base body in accordance with an 11th aspect of the invention is characterized in that the cavity is formed so as to have narrow-width protruding portions respectively extending from vicinities of the bottom of the recessed surface to apex surfaces of the recessed surface along edge portions on both sides of the recessed surface.

In accordance with the manufacturing method according to the 11th aspect, it is possible to manufacture the rack guide base body having narrow-width protruding portions respectively extending from vicinities of the bottom of the recessed surface to apex surfaces of the recessed surface along edge portions on both sides of the recessed surface. As a result, in the case where the slider is provided on the recessed surface, the deformation of the slider can be prevented, and the slider can be held reliably on the recessed surface.

A rack guide in accordance with the first aspect of the invention comprises: a rack guide base body having on its outer peripheral surface a pair of semicylindrical surfaces and a pair of planar surfaces each located between the pair of semicylindrical surfaces, having a recessed surface located on one axial end portion side inwardly of the pair of semicylindrical surfaces and the planar surfaces, and having a cylindrical surface located on another axial end portion side inwardly of the pair of semicylindrical surfaces and the planar surfaces; and a slider secured to the rack guide base body.

In accordance with a rack guide according to a first aspect, the rack guide has on its outer peripheral surface a pair of semicylindrical surfaces and a pair of planar surfaces. As a result, it is possible to provide the rack guide whose movement is guided smoothly by the cylindrical housing of the rack-and-pinion type steering apparatus irrespective of the cut remnants and the like of the gate at the pair of planar surfaces.

In accordance with the rack guide according to a second aspect of the invention, in the rack guide according to the first aspect, the rack guide base body has a circular-arc shaped recessed surface. In accordance with the rack guide according to a third aspect of the invention, in the rack guide according to the first aspect, the rack guide base body has a recessed surface including a pair of mutually opposing planar surfaces and a pair of inclined surfaces respectively extending integrally from the pair of planar surfaces. In accordance with the rack guide according to a fourth aspect of the invention, in the rack guide according to any one of the first to third aspects, the rack guide base body has a hole in a center of a bottom of the recessed surface, and the slider has a projecting portion which is fitted in the hole of the rack guide base body. In accordance with the rack guide according to a fifth aspect of the invention, in the rack guide according to the fourth aspect, the hole is constituted by a through hole or a hole with a bottom. In accordance with the rack guide according to a sixth aspect of the invention, in the rack guide according to any one of the first to fifth aspects, the pair of planar surfaces are connected to respective ends of the bottom of the recessed surface and are located in such a manner as to oppose each other.

Preferably, as in the rack guide in accordance with a seventh aspect of the invention, the rack guide base body has at least one annular groove in the outer peripheral surface consisting of the pair of semicylindrical surfaces and the pair of planar surfaces. More preferably, as in the rack guide in accordance with an eighth aspect of the invention, the rack guide base body has at least two rows of annular grooves in the outer peripheral surface consisting of the pair of semicylindrical surfaces and the pair of planar surfaces. The rack guide in accordance with the seventh or eighth aspect of the invention, as in the rack guide in accordance with a ninth aspect of the invention, further comprises an elastic ring fitted in the annular groove in such a manner as to partially project from the outer peripheral surface to an outside.

As an elastic ring is fitted in the annular groove provided in the rack guide base body, it is possible to produce the gap which is maintained by the elastic ring between the rack guide base body and the cylindrical housing. Consequently, as described above, it is possible to overcome the problem that the movement of the rack guide toward the rack bar is hampered by an increase in the frictional resistance and the occurrence of adhesive wear accompanying such a "metal of similar composition." Hence, it becomes possible to allow the movement of the rack guide with respect to the rack bar to be effected smoothly. Moreover, even if wheel vibrations are transmitted to the rack guide, the rack guide is prevented from rattling with respect to the cylindrical housing. It is therefore possible to prevent the hammering sound of the rack guide base body with respect to the inner peripheral surface of the cylindrical housing. Furthermore, even if a force acting in a direction perpendicular to the moving direction of rack teeth has been applied to the rack teeth during the steering of the steering wheel, it is possible to prevent the vertical movement, i.e., jerky movement, of the rack guide.

In accordance with the rack guide according to a 10th aspect of the invention, the rack guide base body has narrow-width protruding portions respectively extending from vicinities of the bottom of the recessed surface to apex surfaces of the recessed surface along edge portions on both sides of the recessed surface.

In accordance with the rack guide according to the 10th aspect, in the case where the slider is provided on the recessed surface, the deformation of the slider can be prevented by the narrow-width protruding portions, and the slider can be favorably held reliably on the recessed surface.

In accordance with the invention, a pair of planar surfaces are formed on the outer peripheral surface of the die-cast rack guide base body, while the outer peripheral surface excluding these planar surfaces is formed into cylindrical surfaces. Therefore, as the runners joined integrally to the respective planar surfaces are cut off at positions which do not project from the phantom circle defined by the semicylindrical surfaces, the cut remnants of the runners do not project from the phantom circle defined by the semicylindrical surfaces. Accordingly, even if the gap which is set between the outer peripheral surface of the rack guide and the inner peripheral surface of the cylindrical housing in which the rack guide base body is disposed is extremely small on the order of 1 to 20 μm, it is unnecessary to effect machining for the entire outer peripheral surface of the rack guide base body. Since the rack guide base body can be disposed as die cast, it is possible to substantially reduce the cost required for machining the entire outer peripheral surface of the rack guide base body. As a result, this permits a reduction in the manufacturing cost of the rack guide.

Hereafter, a more detailed description will be given of the mode for carrying out the invention with reference to the preferred embodiments illustrated in the drawings. It should be noted that the invention is not limited by these embodiments.

BRIEF DESCRIPTION OF THE DRAWINGS

FIG. 18 is a cross-sectional view taken in the direction of arrows along line XVIII-XVIII shown in FIG. 17;

BEST MODE FOR CARRYING OUT THE INVENTION

Figure 1:
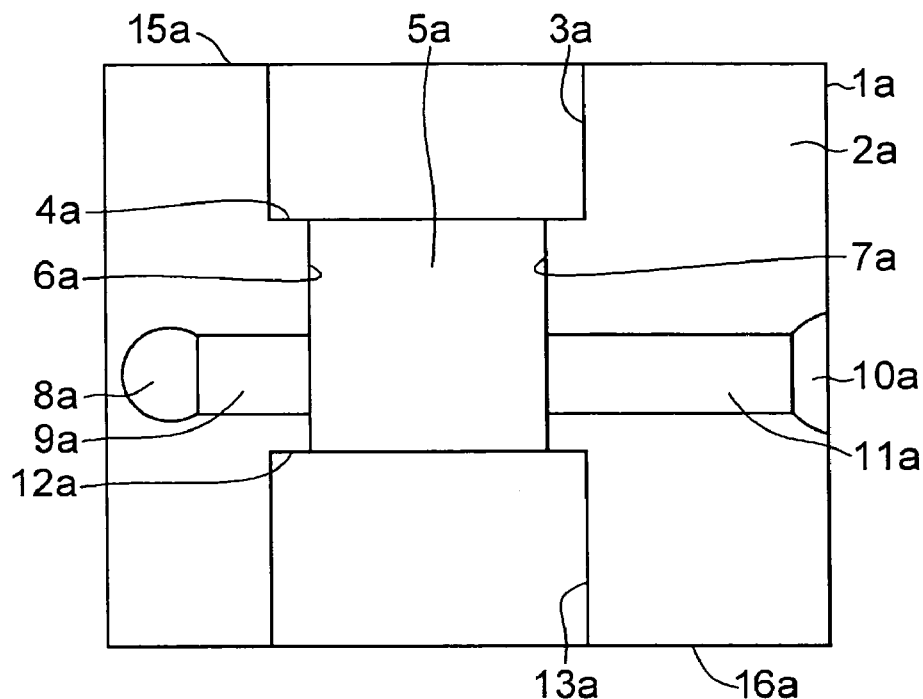
FIG. 1 is a plan view of a lower die half in the manufacturing method of the invention.

In FIGS. 1 to 6, a die 1 is formed by a lower die half 1*a* and an upper die half 1*b* which are split in two. As shown in FIG. 1, the lower die half 1*a* is comprised of a semicylindrical concave surface 3*a* for forming a semicylindrical concave portion which is formed in one surface 2*a* and is open in one end face 15*a* of the upper die half 1*a*; a semicylindrical concave surface 5*a* whose diameter is reduced relative to that semicylindrical concave surface 3*a* via an annular stepped portion 4*a* and which forms a semicylindrical concave portion of an intermediate portion; planar surfaces 6*a* and 7*a* formed in face-to-face relation to each other at both edges of that semicylindrical concave surface 5*a*; a recessed channel 9*a* with a rectangular cross section having one end communicating with the planar surface 6*a* and the other end communicating with a recess 8*a* constituting an overflow well; a recessed channel 11*a* with a rectangular cross section having one end communicating with the planar surface 7*a* and the other end communicating with a recess 10*a* constituting a gate; and a semicylindrical concave surface 13*a* for forming a semicylindrical concave portion whose diameter is enlarged relative to that semicylindrical concave surface 5*a* via an annular stepped portion 12*a*, and which is open in the other end face 16*a* of the lower die half 1*a*.

Figure 2:
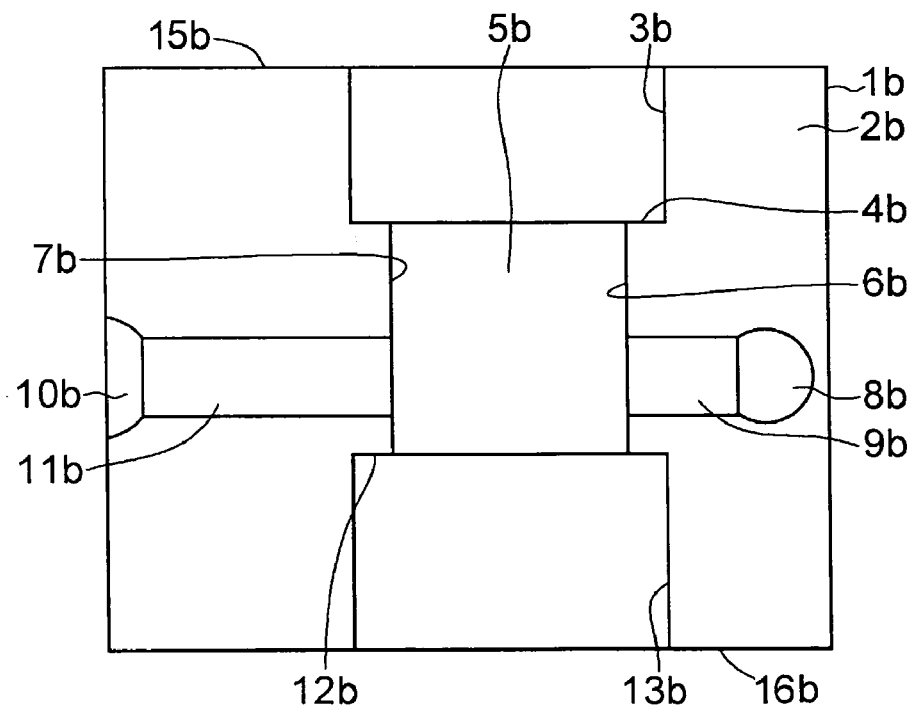
FIG. 2 is a plan view of an upper die half in the manufacturing method of the invention.

As shown in FIG. 2, the upper die half 1*b* is comprised of a semicylindrical concave surface 3*b* for forming a semicylindrical concave portion which is formed in one surface 2*b* and is open in one end face 15*b* of the upper die half 1*b*; a semicylindrical concave surface 5*b* whose diameter is reduced relative to that semicylindrical concave surface 3*b* via an annular stepped portion 4*b* and which forms a semicylindrical concave portion of an intermediate portion; planar surfaces 6*b* and 7*b* formed in face-to-face relation to each other at both edges of that semicylindrical concave surface 5*b*; a recessed channel 9*b* with a rectangular cross section having one end communicating with the planar surface 6*b* and the other end communicating with a recess 8*b* constituting the overflow well; a recessed channel 11*b* with a rectangular cross section having one end communicating with the planar surface 7*b* and the other end communicating with a recess 10*b* constituting the gate; and a semicylindrical concave surface 13*b* for forming a semicylindrical concave portion whose diameter is enlarged relative to that semicylindrical concave surface 5*b* via an annular stepped portion 12*b*, and which is open in the other end face 16*b* of the upper die half 1*b*.

Figure 3:
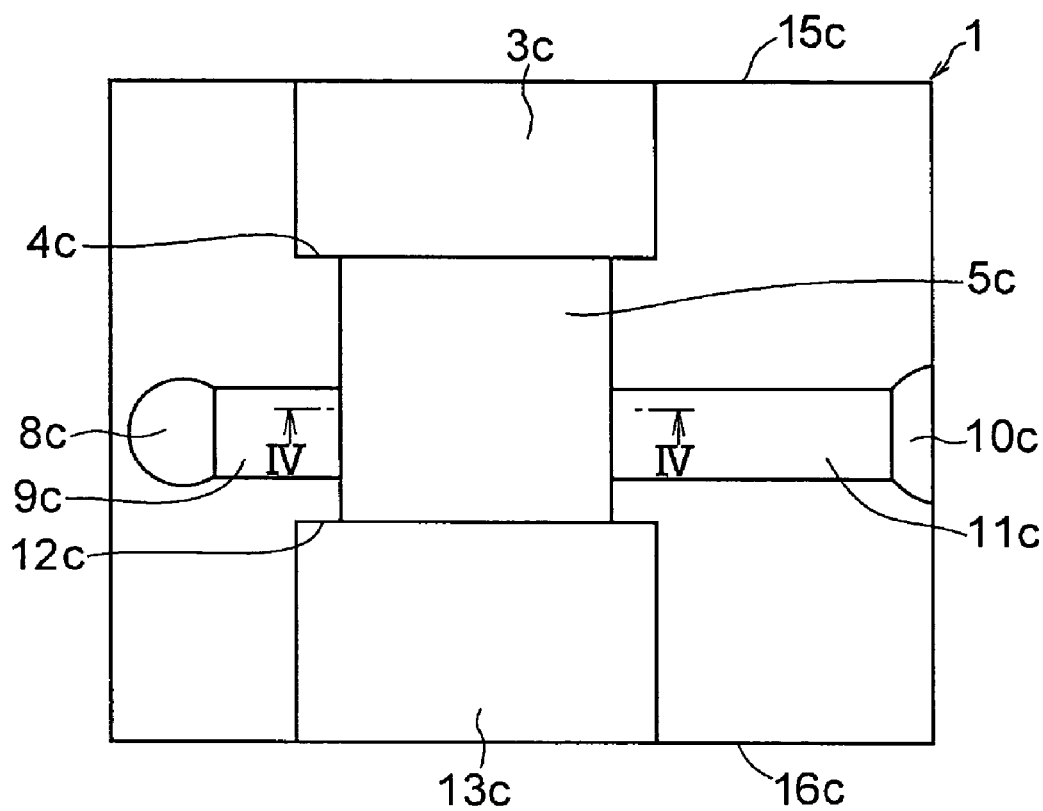
FIG. 3 is a cross-sectional view of a die in the manufacturing method of the invention.
Figure 4:
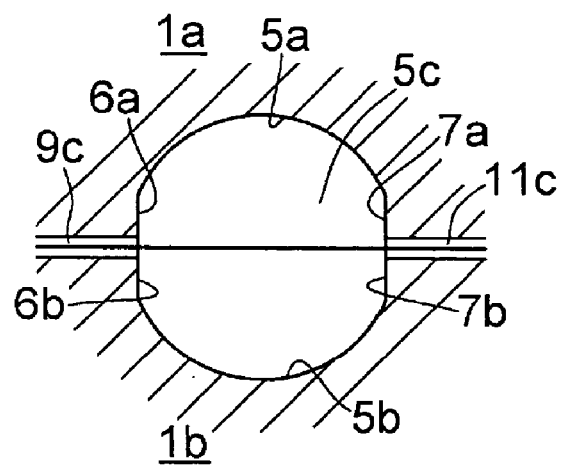
FIG. 4 is a cross-sectional view taken in the direction of arrows along line IV-IV shown in FIG. 3.

As one surface 2b of the upper die half 1b is superposed on one surface 2a of the lower die half 1a, the following are formed in the die 1, as particularly shown in FIGS. 3 and 4: a cylindrical hollow portion 3c which is open in one end face 15c formed by the end faces 15a and 15b, and is surrounded by the semicylindrical concave surfaces 3a and 3b; a substantially cylindrical hollow portion 5c whose diameter is reduced via an annular stepped portion 4c formed by the annular stepped portions 4a and 4b, and which communicates with the cylindrical hollow portion 3c and is surrounded by the semicylindrical concave surfaces 5a and 5b and the planar surfaces 6a, 7a and 6b, 7b; a cylindrical hollow portion 13c whose diameter is enlarged via an annular stepped portion 12c formed by the annular stepped portions 12a and 12b, and which communicates with the substantially cylindrical hollow portion 5c, is open in the other end face 16c formed by the end faces 16a an 16b, and is surrounded by the semicylindrical concave surfaces 13a and 13b; a hollow portion 9c with a rectangular cross section which has one end communicating with the substantially cylindrical hollow portion 5c at the one planar surfaces 6a and 6b and the other end communicating with a hollow portion 8c constituting the overflow well and formed by the recesses 8a and 8b, the hollow portion 9c being formed by the recessed channels 9a and 9b; and a hollow portion 11c with a rectangular cross section which has one end communicating with the substantially cylindrical hollow portion 5c at the other planar surfaces 7a and 7b and the other end communicating with a hollow portion 10c constituting the gate and formed by the recesses 10a and 10b, the hollow portion 11c being formed by the recessed channels 11a and 11b.

Figure 5:
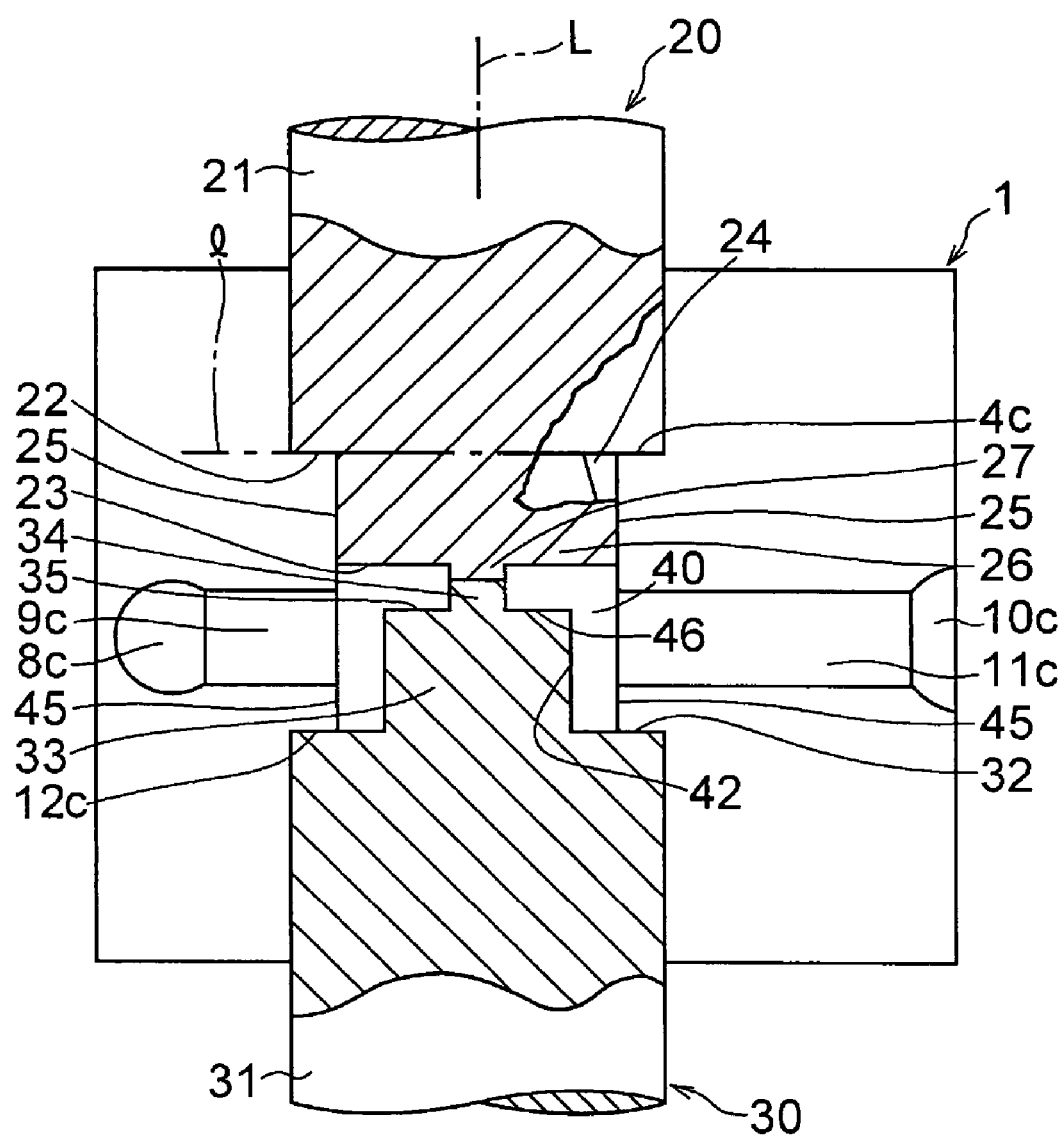
FIG. 5 is a cross-sectional view illustrating a hollow portion formed in the die.
Figure 6:
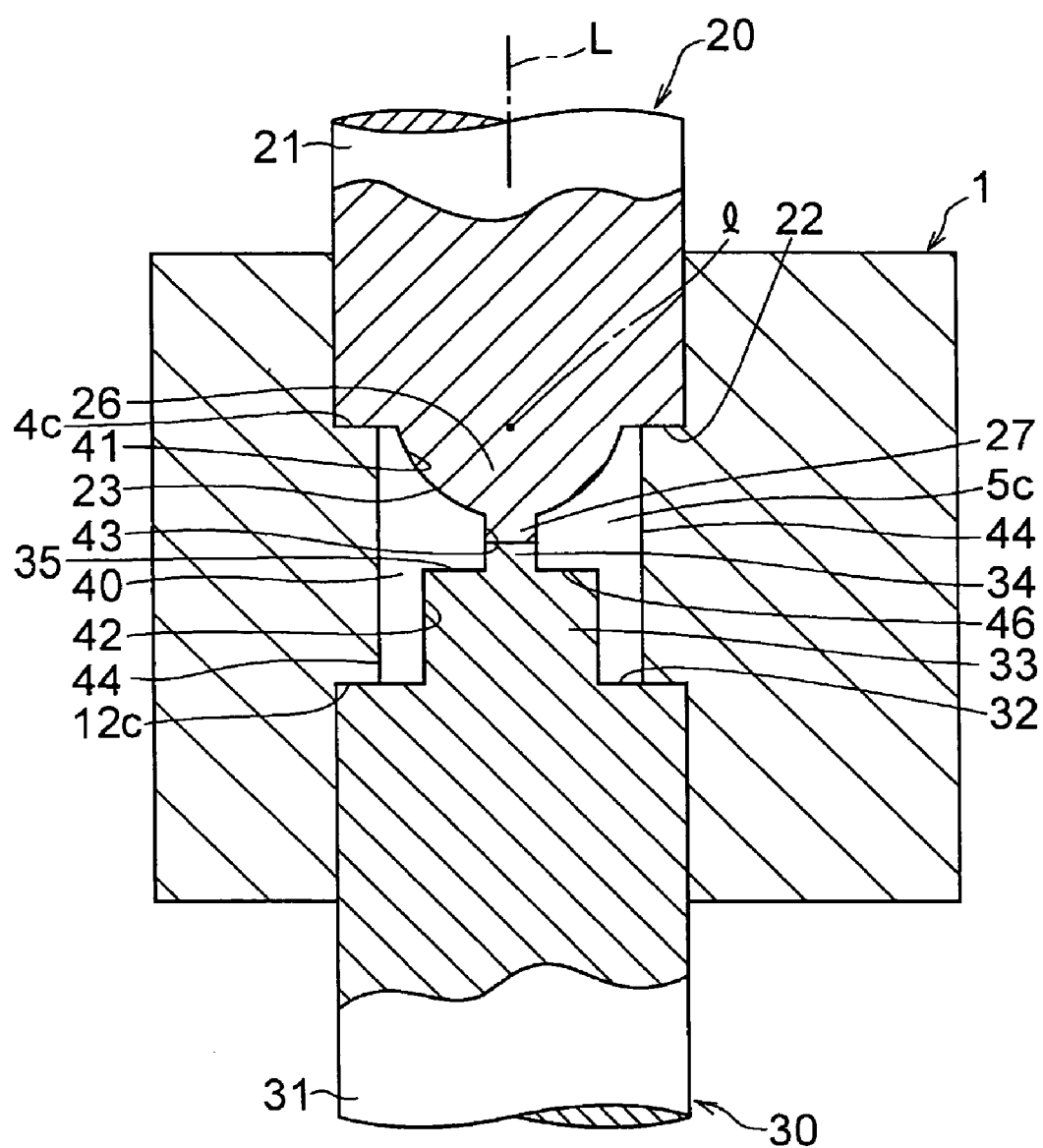
FIG. 6 is a cross-sectional view illustrating the hollow portion formed in the die.

As particularly shown in FIGS. 5 and 6, a movable die 20 is inserted in the cylindrical hollow portion 3c of the die 1. The movable die 20 has a circular cylindrical portion 21 of a shape complementary to the cylindrical hollow portion 3c, a circular arc-shaped projecting portion 26, and a circular cylindrical projecting portion 27 formed integrally on a central portion of the circular arc-shaped projecting portion 26. The circular arc-shaped projecting portion 26 is formed integrally on one end face of the circular cylindrical portion 21 by leaving a planar portion 22 around its peripheral edge, and its outer surface is formed into a circular arc-shaped convexly projecting surface 23 about an axis 1 perpendicular to an axis L of the circular cylindrical portion 21. Both end faces of the circular arc-shaped projecting portion 26 respectively have cylindrical surfaces 24 and planar surfaces 25 which are of a shape complementary to the semicylindrical concave surfaces 5a and 5b and the planar surfaces 6a, 6b and 7a, 7b defining the substantially cylindrical hollow portion 5c of the die 1. The movable die 20 is inserted such that the planar portion 22 abuts against the annular stepped portion 4c of the die 1, and the circular arc-shaped projecting portion 26 is located in the substantially cylindrical hollow portion 5c.

As particularly shown in FIGS. 5 and 6, a movable die 30 is inserted in the cylindrical hollow portion 13c. The movable die 30 has a circular cylindrical portion 31 of a shape complementary to the cylindrical hollow portion 13c, a circular cylindrical projecting portion 33 formed integrally on one end face of the circular cylindrical portion 31 by leaving an annular planar portion 32 around its peripheral edge, and a circular cylindrical projecting portion 34 formed integrally on a central portion of an end face of that circular cylindrical projecting portion 33 by leaving an annular planar portion 35. The movable die 30 is inserted such that the planar portion 32 abuts against the annular stepped portion 12c of the die 1, the circular cylindrical projecting portion 34 abuts against an end face of the circular cylindrical projecting portion 27, and the circular cylindrical projecting portion 33 is located in the substantially cylindrical hollow portion 5c.

A cavity 40 is formed in the die 1 by means of the die 1 consisting of the lower die half 1a and the upper die half 1b as well as the movable die 20 and the movable die 30. The cavity 40 is provided with the following: a pair of semicylindrical convex surfaces 44 (corresponding to portions of the semicylindrical concave surfaces 5a and 5b); a pair of planar surfaces 45 (corresponding to portions of the planar surfaces 6a, 7a and 6b, 7b) each located between the pair of semicylindrical convex surfaces 44 and opposed to each other; a circular arc-shaped concavely recessed surface 41 (corresponding to the convexly projecting surface 23) located on one axial end portion side inwardly of the pair of semicylindrical convex surfaces 44 and the planar surfaces 45; and a cylindrical surface 42 (corresponding to an outer peripheral cylindrical surface of the circular cylindrical projecting portion 33) located on the other axial end portion side inwardly of the pair of semicylindrical convex surfaces 44 and the planar surfaces 45. The cavity 40 is further provided with a cylindrical surface 43 (corresponding to outer peripheral cylindrical surfaces of the circular cylindrical projecting portions 27 and 34) which is connected at its one end to a center of the bottom of the concavely recessed surface 41 on the other axial end portion side, is located inwardly of the pair of semicylindrical convex surfaces 44 and the planar surfaces 45, and has a smaller diameter than the cylindrical surface 42; and an annular surface 46 (corresponding to the planar portion 35) which is connected at its inner peripheral end to the other end of the small-diameter cylindrical surface 43 and is connected at its outer peripheral end to one end of the cylindrical surface 42, the pair of mutually opposing planar surfaces 45 being connected to respective ends of the bottom of the concavely recessed surface 41. Further formed in the die 1 are the hollow portion 11c with a rectangular cross section which has one end communicating with the cavity 40 and the other end communicating with the hollow portion 10c constituting the gate, the hollow portion 11c forming a runner channel for allowing the hollow portion 10c to communicate with the cavity 40 at one planar surface 45; and the hollow portion 9c with a rectangular cross section which has one end communicating with the cavity 40 and the other end communicating with the hollow portion 8c constituting the overflow well, the hollow portion 9c forming a runner channel for allowing the hollow portion 8c to communicate with the cavity 40 at the other planar surface 45.

In addition, molten metal of such as aluminum is forced into the cavity 40 through the hollow portion 10c serving as the gate, so as to effect die casting.

Figure 7:
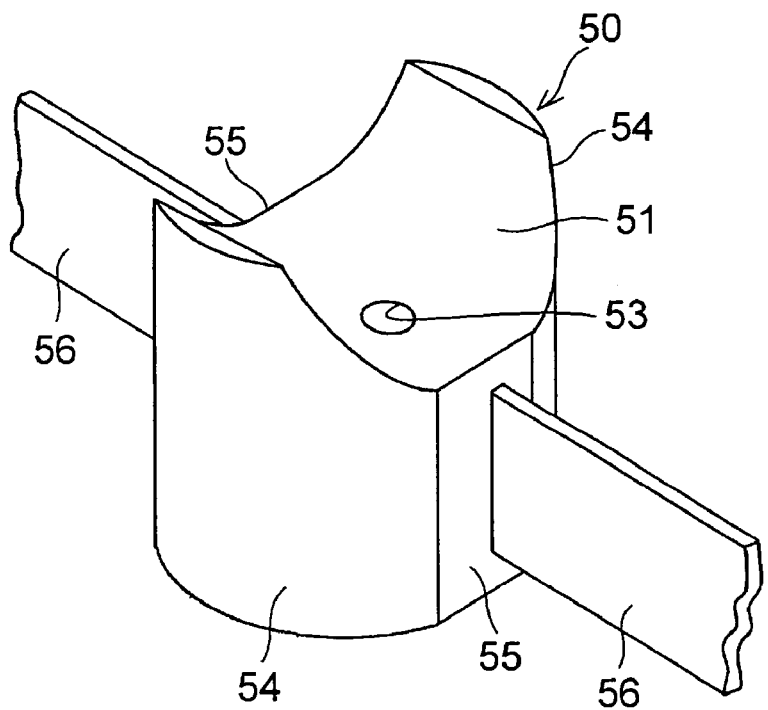
FIG. 7 is a perspective view illustrating a rack guide base body after die casting.

FIG. 7 shows a rack guide base body 50 removed from the die 1 after die casting. The rack guide base body 50 has on its outer peripheral surface a pair of semicylindrical surfaces 54 and a pair of planar surfaces 55 each located between the pair of semicylindrical surfaces 54. The rack guide base body 50 further has a circular arc-shaped concavely recessed surface 51 located on one axial end portion side inwardly of the pair of semicylindrical surfaces 54 and the planar surfaces 55; a cylindrical surface 52 (see FIG. 8) located on the other axial end portion side inwardly of the pair of semicylindrical surfaces 54 and the planar surfaces 55; and a circular hole 53 located in the center of the bottom of the concavely recessed surface 51. A pair of runners 56 are integrally joined to the respective planar surfaces 55 which are connected to the respective ends of the bottom of the concavely recessed surface 51 and are located in such a manner as to oppose each other.

The rack guide base body 50 for use in a rack-and-pinion type steering apparatus is formed as the pair of runners 56 joined integrally to the planar surfaces 55 formed by the planar surfaces 6a, 7a and 6b, 7b are cut off along the planar surfaces 55 at positions which do not project from a phantom circle 57 (see FIG. 9) defined by the semicylindrical surfaces 54 at the outer peripheral surface.

The cut remnants of the runners 56 at the planar surfaces 55 of the rack guide base body 50 do not project from the phantom circle 57 defined by the semicylindrical surfaces 54 at the outer peripheral surface. Therefore, even with a very small gap of 1 to 20 µm which is set between the semicylindrical surface 54 at the outer peripheral surface and an inner peripheral surface of a cylindrical housing of the rack-and-pinion type steering apparatus where the rack guide base body 50 is disposed, it is unnecessary to separately remove the cut remnants of the runners 56 and effect machining for the entire outer peripheral surface of the rack guide base body 50. Since the rack guide base body 50 can be disposed as die cast, it is possible to substantially reduce the cost required for machining the entire outer peripheral surface of the rack guide base body 50. As a result, this permits a reduction in the manufacturing cost of the rack guide.

Figure 8:
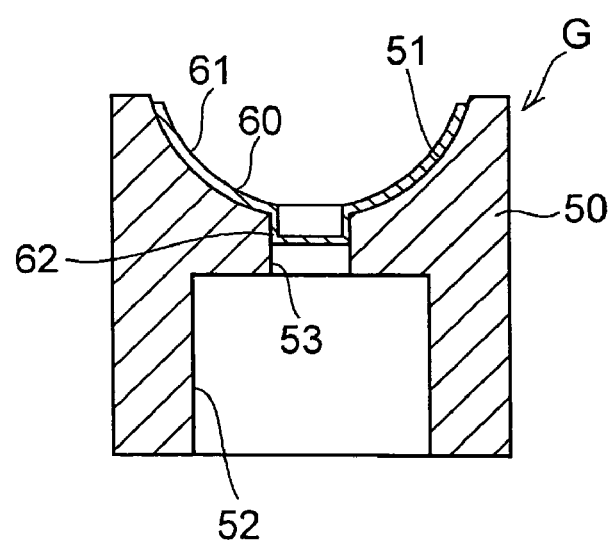
FIG. 8 is a cross-sectional view of a rack guide, as viewed in the direction of arrows along line VIII-VIII shown in FIG. 9.
Figure 9:
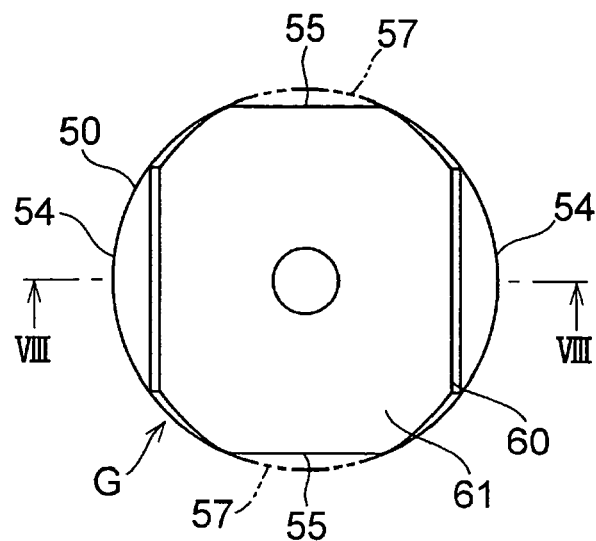
FIG. 9 is a plan view of the rack guide shown in FIG. 8.

As shown in FIGS. 8 and 9, a slider 60, which has a circular arc-shaped concavely recessed surface 61 of a shape complementary to the concavely recessed surface 51 and an engaging projection 62 serving as a projecting portion on a reverse surface of the concavely recessed surface 61, is seated on the concavely recessed surface 51 such that the engaging projection 62 is fitted in the hole 53 formed in the center of the concavely recessed surface 51 of the rack guide base body 50. Thus a rack guide G in which the slider 60 is secured to the rack guide base body 50 is formed.

As the slider 60, it is suitable to use a synthetic resin such as a polyacetal resin or a polyamide resin, or a multilayered material consisting of a steel sheet, a porous metal sintered layer deposited and formed integrally on this steel sheet, and a synthetic resin layer impregnating and coated on this porous metal sintered layer.

Figure 10:
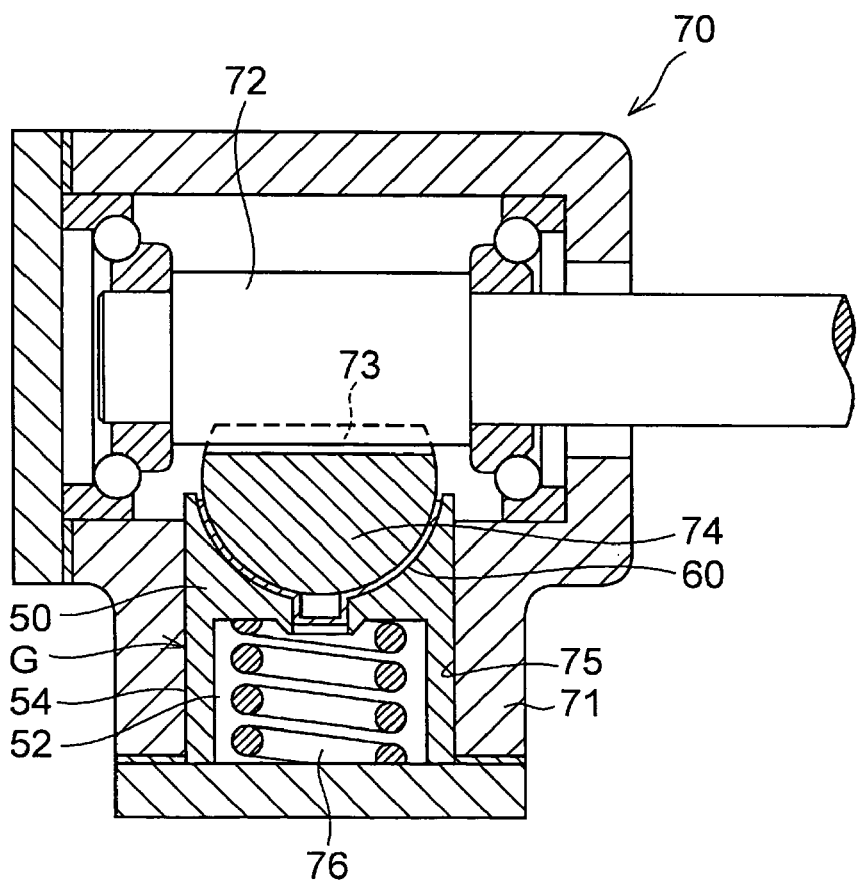
FIG. 10 is a cross-sectional view illustrating a rack-and-pinion type steering apparatus.

In a rack-and-pinion type steering apparatus 70 shown in FIG. 10, this rack guide G is accommodated in a cylindrical housing 71 so as to slidably support a rack bar 74 having rack teeth 73 formed thereon for meshing with a pinion 72 rotatably supported in the cylindrical housing 71. At this time, in the rack guide G, even if the gap which is set between the semicylindrical surface 54 at the outer peripheral surface of the rack guide base body 50 and an inner peripheral surface 75 of the cylindrical housing 71 is very small on the order of 1 to 20 µm, the cut remnants of the runners 56 at the planar surfaces 55 of the rack guide base body 50 do not project from the phantom circle 57 defined by the semicylindrical surfaces 54. Therefore, the movement of the rack guide G by being pressed toward the rack bar 74 side by a spring 76 disposed in the cylindrical surface 52 of the rack guide G in the cylindrical housing 71 can be effected smoothly without needing to separately remove the cut remnants of the runners 56.

FIGS. 11 to 14 show a method of manufacturing the rack guide base body in accordance with another embodiment. Also in this method of manufacturing the rack guide base body, it is possible to use as it is the die 1 consisting of the lower die half 1a and the upper die half 1b used in the above-described method of manufacturing the rack guide base body 50. Hence, a description will be given by using identical reference numerals for the die 1.

As the one surface 2b of the upper die half 1b is superposed on the one surface 2a of the lower die half 1a, the cylindrical hollow portion 3c, the substantially cylindrical hollow portion 5c, the cylindrical hollow portion 13c, the hollow portion 9c, and the hollow portion 11c are formed in the die 1 in the same way as described above (see FIG. 3).

Figure 11:
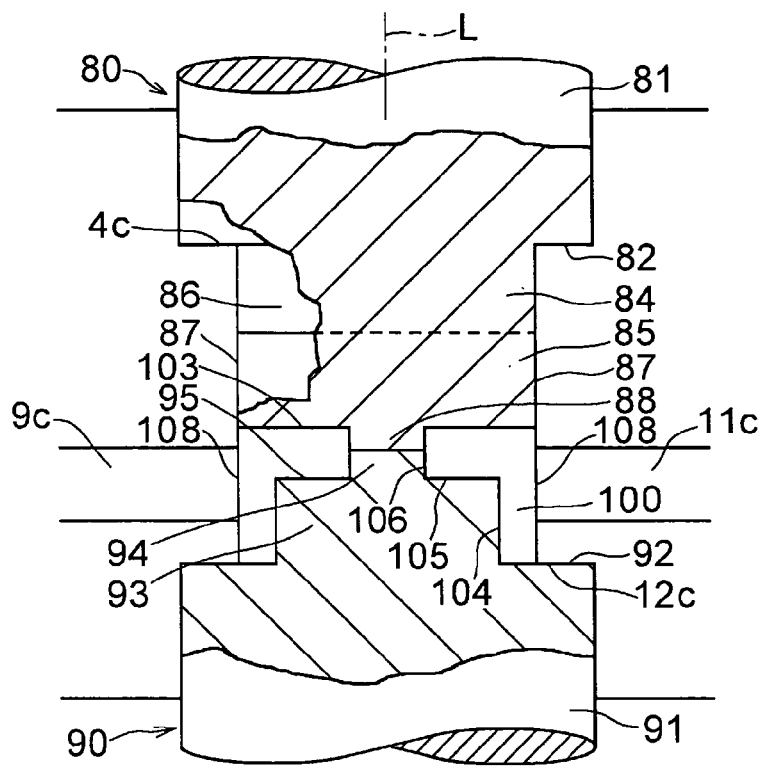
FIG. 11 is a cross-sectional view illustrating the hollow portion formed in the die.
Figure 12:
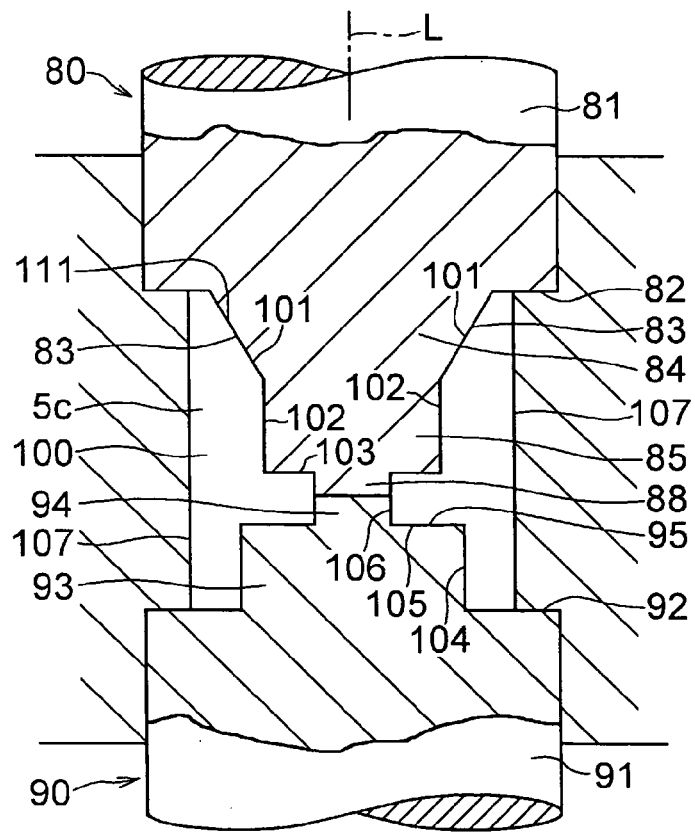
FIG. 12 is a cross-sectional view illustrating the hollow portion formed in the die.

As shown in FIGS. 11 and 12, a movable die 80 is inserted in that cylindrical hollow portion 3c. The movable die 80 has a circular cylindrical portion 81 of a shape complementary to the cylindrical hollow portion 3c; an inclined projecting portion 84; a projecting portion 85 with a rectangular cross section formed integrally on the inclined projecting portion 84; and a circular cylindrical projecting portion 88 formed integrally on a central portion of that projecting portion 85. The inclined projecting portion 84 is formed integrally on one end face of the circular cylindrical portion 81 by leaving a planar portion 82 around its peripheral edge, and has a pair of mutually opposing inclined surfaces 83 which converge from the planar portion 82 along the direction of the axis L of the circular cylindrical portion 81. Both end faces of the inclined projecting portion 84 and the projecting portion 85 are respectively formed into cylindrical surfaces 86 and planar surfaces 87 which are of a shape complementary to the semicylindrical concave surfaces 5a and 5b and the planar surfaces 6a, 6b and 7a, 7b defining the substantially cylindrical hollow portion 5c of the die 1. The movable die 80 is inserted such that the planar portion 82 abuts against the annular stepped portion 4c of the die 1, and the inclined projecting portion 84 and the projecting portion 95 are located in the substantially cylindrical hollow portion 5c.

As shown in FIGS. 11 and 12, a movable die 90 is inserted in the cylindrical hollow portion 13c. The movable die 90 has a circular cylindrical portion 91 of a shape complementary to the cylindrical hollow portion 13c, a circular cylindrical projecting portion 93 formed integrally on one end face of the circular cylindrical portion 91 by leaving an annular planar portion 92 around its peripheral edge, and a circular cylindrical projecting portion 94 formed integrally on a central portion of an end face of that circular cylindrical projecting portion 93 by leaving an annular planar portion 95. The movable die 90 is inserted such that the planar portion 92 abuts against the annular stepped portion 12c of the die 1, the circular cylindrical projecting portion 94 abuts against an end face of the circular cylindrical projecting portion 88, and the circular cylindrical projecting portion 93 is located in the substantially cylindrical hollow portion 5c.

A cavity 100 is formed in the die 1 by means of the die 1 consisting of the lower die half 1a and the upper die half 1b as well as the movable die 80 and the movable die 90. The cavity 100 is provided with the following: a pair of semicylindrical convex surfaces 107 (corresponding to portions of the semicylindrical concave surfaces 5a and 5b); a pair of planar surfaces 108 (corresponding to portions of the planar surfaces 6a, 7a and 6b, 7b) each located between the pair of semicylindrical convex surfaces 107 and opposed to each other; a recessed surface 111 including a pair of planar surfaces 102 (corresponding to side surfaces of the projecting portion 85) located on one axial end portion side inwardly of the pair of semicylindrical convex surfaces 107 and the planar surfaces 108 and opposed to each other, a pair of inclined surfaces 101 (corresponding to the inclined surfaces 83) respectively extending integrally from the pair of planar surfaces 102, and a horizontal surface 103 (corresponding to the lower surface of the projecting portion 85) continuing from the pair of planar surfaces 102; and a cylindrical surface 104 (corresponding to an outer peripheral cylindrical surface of the circular cylindrical projecting portion 93) located on the other axial end portion side inwardly of the pair of semicylindrical convex surfaces 107 and the planar surfaces 108. The cavity 100 is further provided with a cylindrical surface 106 (corresponding to outer peripheral cylindrical surfaces of the circular cylindrical projecting portions 88 and 94) which is connected at its one end to a center of the bottom of the recessed surface 111 on the other axial end portion side, is located inwardly of the pair of semicylindrical convex surfaces 107 and the planar surfaces 108, and has a smaller diameter than the cylindrical surface 104; and an annular surface 105 (corresponding to the planar portion 95) which is connected at its inner peripheral end to the other end of the small-diameter cylindrical surface 106 and is connected at its outer peripheral end to one end of the cylindrical surface 104, the mutually opposing pair of planar surfaces 108 being connected to respective ends of the bottom of the recessed surface 111. Further formed in the die 1 are the hollow portion 11c with a rectangular cross section which has one end communicating with the cavity 100 and the other end communicating with the hollow portion 10c constituting the gate, the hollow portion 11c forming a runner channel for allowing the hollow portion 10c to communicate with the cavity 100 at one planar surface 108; and the hollow portion 9c with a rectangular cross section which has one end communicating with the cavity 100 and the other end communicating with the hollow portion 8c constituting the overflow well, the hollow portion 9c forming a runner channel for allowing the hollow portion 8c to communicate with the cavity 100 at the other planar surface 108.

In addition, molten metal of such as aluminum is forced into the cavity 100 through the hollow portion 10c serving as the gate, so as to effect die casting.

With a rack guide base body 200 removed from the die 1 after die casting, in the same way as the rack guide base body 50 in the above-described embodiment, the runners 56 are integrally joined to a pair of planar surfaces 207 opposing each other at the outer peripheral surface. These runners 56 are cut off along the planar surfaces 207 at positions which do not project from a phantom circle 109 defined by a pair of semicylindrical surfaces 206 at the outer peripheral surface, thereby forming the rack guide base body 200.

Figure 13:
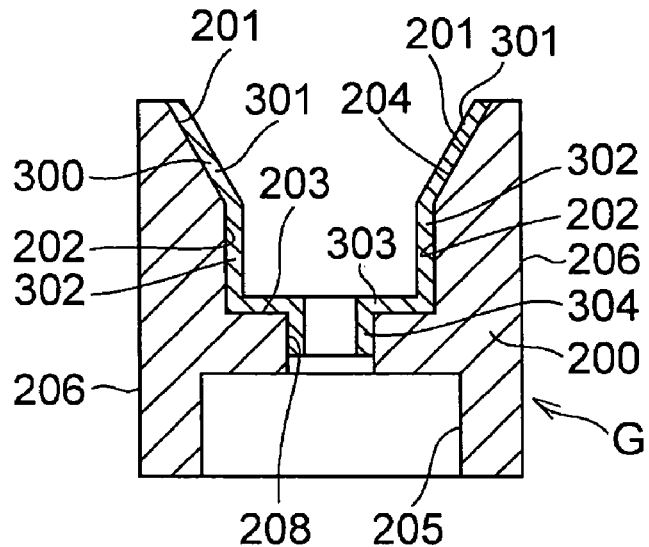
FIG. 13 is a cross-sectional view of the rack guide, as viewed in the direction of arrows along line XIII-XIII shown in FIG. 4.
Figure 14:
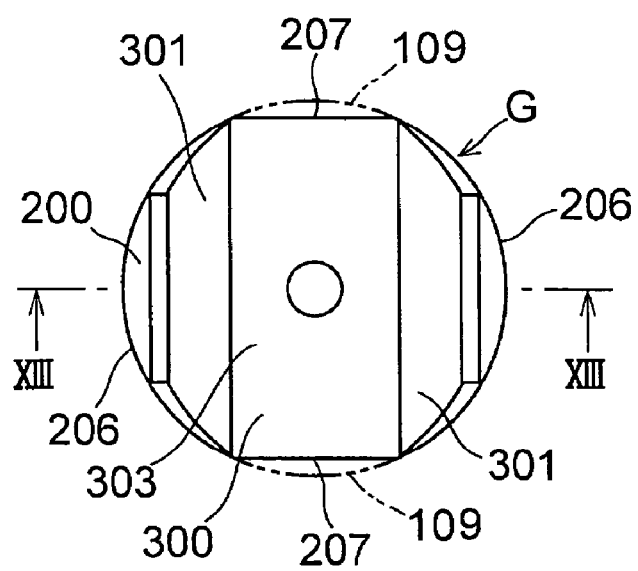
FIG. 14 is a plan view of the rack guide shown in FIG. 13.

As shown in FIGS. 13 and 14, the rack guide base body 200 thus formed of aluminum or the like has on its outer peripheral surface a pair of semicylindrical surfaces 206 and the pair of planar surfaces 207 each located between the pair of semicylindrical surfaces 206. The rack guide base body 200 is further provided with a recessed surface 204 which includes a pair of planar surfaces 102 located on one axial end portion side inwardly of the pair of semicylindrical surfaces 206 and the planar surfaces 207 and opposed to each other, a pair of inclined surfaces 201 respectively extending integrally from the pair of planar surfaces 202 and opposed to each other, and a horizontal surface 203 extending integrally from the pair of planar surfaces 202. Furthermore, the rack guide base body 200 is provided with a cylindrical surface 205 located on the other axial end portion side inwardly of the pair of semicylindrical surfaces 206 and the planar surfaces 207, and is provided with and a circular hole 208 located in the center of the bottom of the recessed surface 204. The pair of planar surfaces 207 are connected to the respective ends of the bottom of the recessed surface 204 and are located in such a manner as to oppose each other.

A slider 300, which has a pair of mutually opposing inclined surface portions 301, a pair of vertical surface portions 302 continuing from the respective inclined surface portions 301, a horizontal surface portion 303 continuing from the respective vertical surface portions 302, and an engaging projection 304 serving as a projecting portion formed integrally on a reverse surface of that horizontal surface portion 303, is seated on the recessed surface 204 such that the engaging projection 304 on the reverse surface of the horizontal surface portion 303 is fitted in the hole 208 formed in the center of the horizontal surface 203 of the rack guide base body 200. Thus the rack guide G is formed by the rack guide base body 200 and the slider 300.

As the slider 300, in the same way as the above-described embodiment it is suitable to use a synthetic resin such as a polyacetal resin or a polyamide resin, or a multilayered material consisting of a steel sheet, a porous metal sintered layer deposited and formed integrally on this steel sheet, and a synthetic resin layer impregnating and coated on this porous metal sintered layer.

Also in the rack guide G shown in FIGS. 13 and 14, even if the very small gap set between the semicylindrical surface 206 at the outer peripheral surface of the rack guide G and the inner peripheral surface 75 of the cylindrical housing 71 is 1 to 20 μm, the cut remnants of the runners at the pair of planar surfaces 207 of the rack guide base body 200 do not project from the phantom circle 109 defined by the semicylindrical surfaces 206. Therefore, the movement of the rack guide G by being pressed toward the rack bar 74 side by the spring 76 disposed in the cylindrical surface 205 of the rack guide G in the cylindrical housing 71 can be effected smoothly without needing to separately remove the cut remnants of the runners.

In addition, in the rack guide G as well, passages can be formed by gaps between the pair of planar surfaces 207 and the cylindrical housing 71, with the result that these passages can be used as air passages or lubricant passages for grease or the like, as necessary.

Figure 15:
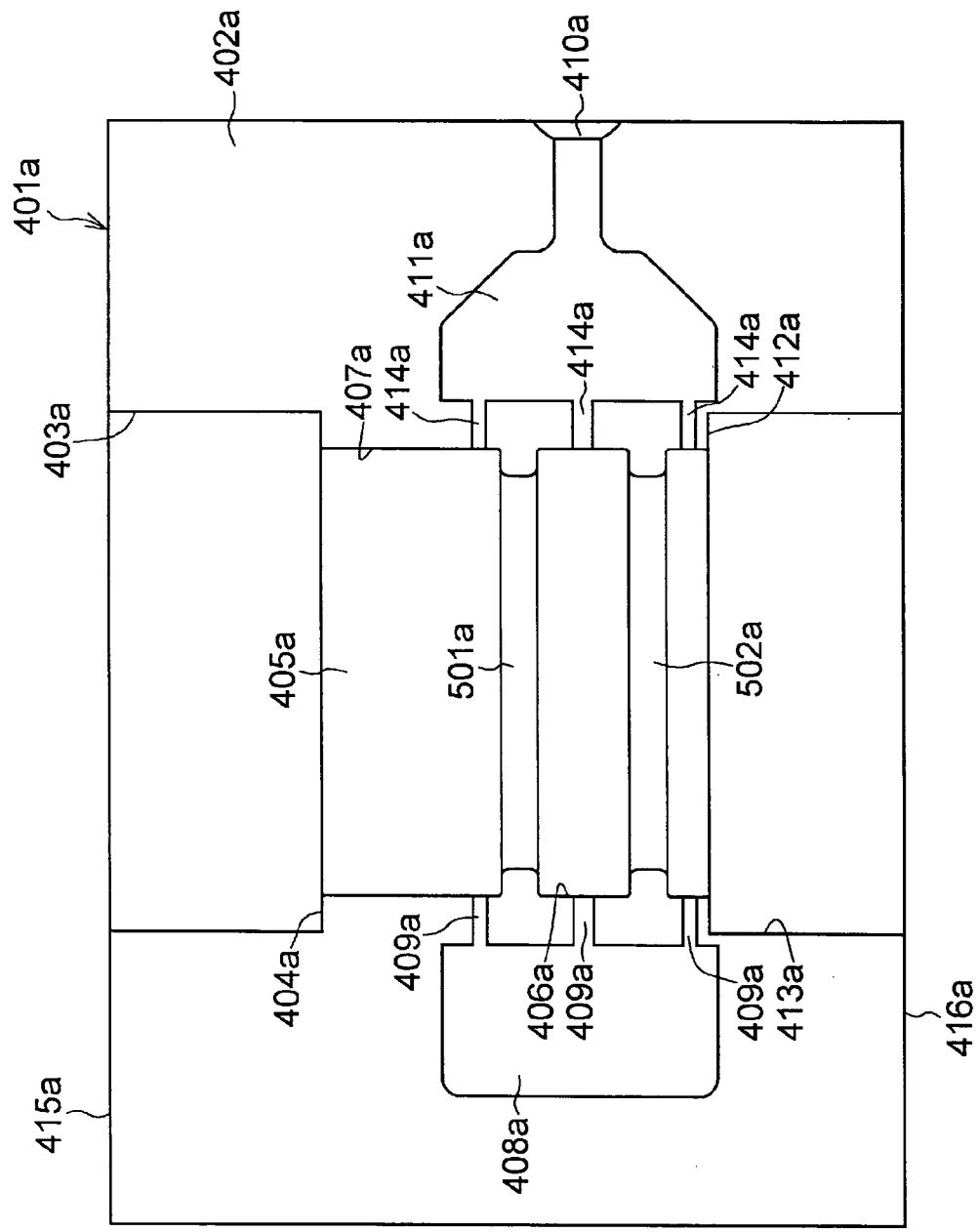
FIG. 15 is a plan view of another lower die half in the manufacturing method of the invention.

FIGS. 15 to 20 show a method of manufacturing the rack guide base body in accordance with still another embodiment. In FIGS. 15 to 20, a die 401 is formed by a lower die half 401a and an upper die half 401b which are split in two. As shown in FIG. 15, the lower die half 401a is comprised of a semicylindrical concave surface 403a for forming a semicylindrical concave portion which is formed in one surface 402a and is open in one end face 415a; a semicylindrical concave surface 405a whose diameter is reduced relative to that semicylindrical concave surface 403a via an annular stepped portion 404a and which forms a semicylindrical concave portion of an intermediate portion; planar surfaces 406a and 407a formed in face-to-face relation to each other at both edges of that semicylindrical concave surface 405a; three recessed channels 409a with a rectangular cross section each having one end communicating with the planar surface 406a and the other end communicating with a recess 408a constituting the overflow well; a recessed channel 411a with a rectangular cross section having three branch channels 414a and having one end communicating with the planar surface 407a through the three branch channels 414a and the other end communicating with a recess 410a constituting the gate; and a semicylindrical concave surface 413a for forming a semicylindrical concave portion whose diameter is enlarged relative to that semicylindrical concave surface 405a via an annular stepped portion 412a, and which is open in the other end face 416a. Two rows of mutually parallel semi-annular projections 501a and 502a are provided on the semicylindrical concave surface 405a and the planar surfaces 406a and 407a. The recessed channels 409a are open at the respective portions of the planar surface 406a separated with respect to the axial direction by the projections 501a and 502a. The branch channels 414a of the recessed channel 411a are open at the respective portions of the planar surface 407a separated with respect to the axial direction by the projections 501a and 502a.

Figure 16:
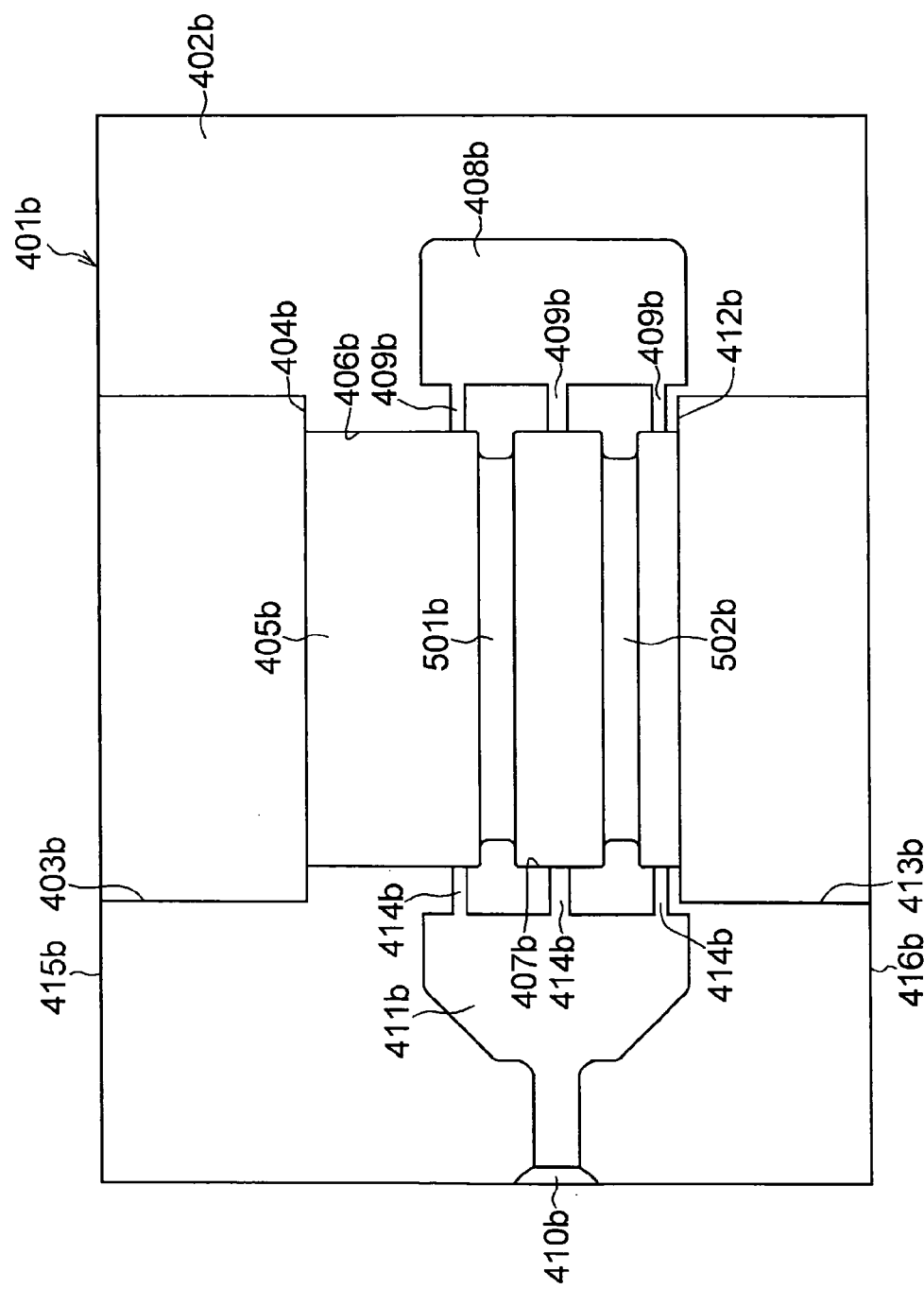
FIG. 16 is a plan view of another upper die half in the manufacturing method of the invention.

As shown in FIG. 16, the upper die half 401b is comprised of a semicylindrical concave surface 403b for forming a semicylindrical concave portion which is formed in one surface 402b and is open in one end face 415b; a semicylindrical concave surface 405b whose diameter is reduced relative to that semicylindrical concave surface 403b via an annular stepped portion 404b and which forms a semicylindrical concave portion of an intermediate portion; planar surfaces 406b and 407b formed in face-to-face relation to each other at both edges of the semicylindrical concave surface 405b; three recessed channels 409b with a rectangular cross section each having one end communicating with the planar surface 406b and the other end communicating with a recess 408b constituting the overflow well; a recessed channel 411b with a rectangular cross section having three branch channels 414b and having one end communicating with the planar surface 407b through the three branch channels 414b and the other end communicating with a recess 410b constituting the gate; and a semicylindrical concave surface 413b for forming a semicylindrical concave portion whose diameter is enlarged relative to that semicylindrical concave surface 405b via an annular stepped portion 412b, and which is open in the other end face 416b. Two rows of mutually parallel semi-annular projections 501b and 502b are provided on the semicylindrical concave surface 405b and the planar surfaces 406b and 407b. The recessed channels 409b are open at the respective portions of the planar surface 406b separated with respect to the axial direction by the projections 501b and 502b. The branch channels 414b of the recessed channel 411b are open at the respective portions of the planar surface 407b separated with respect to the axial direction by the projections 501b and 502b.

Figure 17:
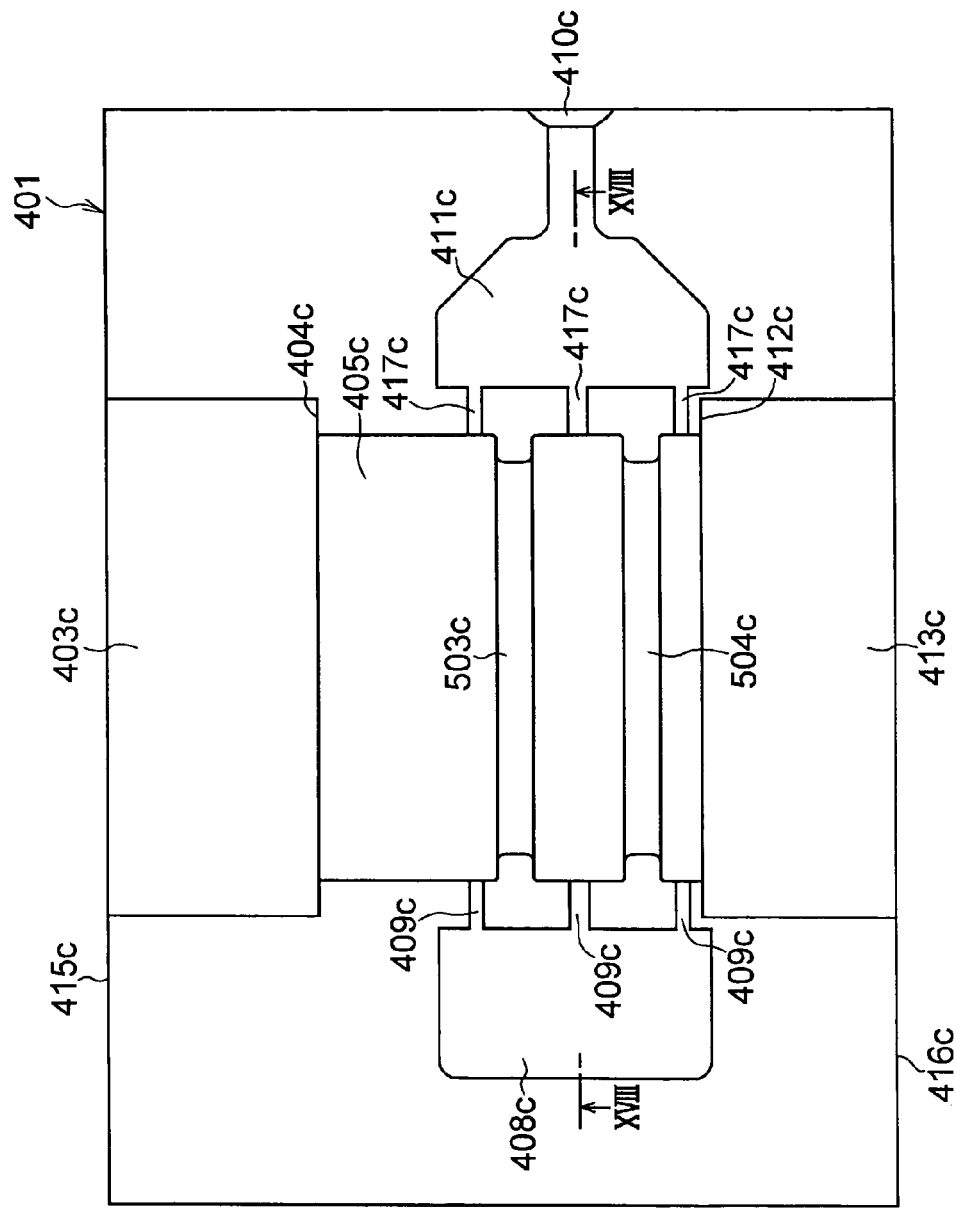
FIG. 17 is a cross-sectional view of another die in the manufacturing method of the invention.

As one surface 402b of the upper die half 401b is superposed on one surface 402a of the lower die half 401a, the following are formed in the die 401, as particularly shown in FIGS. 17 and 18: a cylindrical hollow portion 403c which is open in one end face 415c formed by the end faces 415a and 415b, and is surrounded by the semicylindrical concave surfaces 403a and 403b; a substantially cylindrical hollow portion 405c whose diameter is reduced via an annular stepped portion 404c formed by the annular stepped portions 404a and 404b, and which communicates with the cylindrical hollow portion 403c and is surrounded by the semicylindrical concave surfaces 405a and 5b and the planar surfaces 406a, 407a and 406b, 407b; a cylindrical hollow portion 413c whose diameter is enlarged via an annular stepped portion 412c formed by the annular stepped portions 412a and 412b, and which communicates with the substantially cylindrical hollow portion 405c, is open in the other end face 416c formed by the end faces 416a an 416b, and is surrounded by the semicylindrical concave surfaces 413a and 413b; three hollow portions 409c with a rectangular cross section each of which has one end communicating with the substantially cylindrical hollow portion 405c at the one planar surfaces 406a and 406b and the other end communicating with a hollow portion 408c constituting the overflow well and formed by the recesses 408a and 408b, the hollow portions 409c being formed by the three recessed channels 409a and the three recessed channels 409b; and a hollow portion 411c with a rectangular cross section which has three hollow branch portions 417c formed by the three branch channels 414a and the three branch channels 414b and has one end communicating with the substantially cylindrical hollow portion 405c at the other planar surfaces 407a and 407b and the other end communicating with a hollow portion 410c constituting the gate and formed by the recesses 410a and 410b, the hollow portion 411c being formed by the recessed channels 411a and 411b. Further, in the substantially cylindrical hollow portion 405c, a reduced-diameter cylindrical hollow portion 503c is formed by the projection 501a and the projection 501b, and a reduced-diameter cylindrical hollow portion 504c is formed by the projection 502a and the projection 502b.

Figure 19:
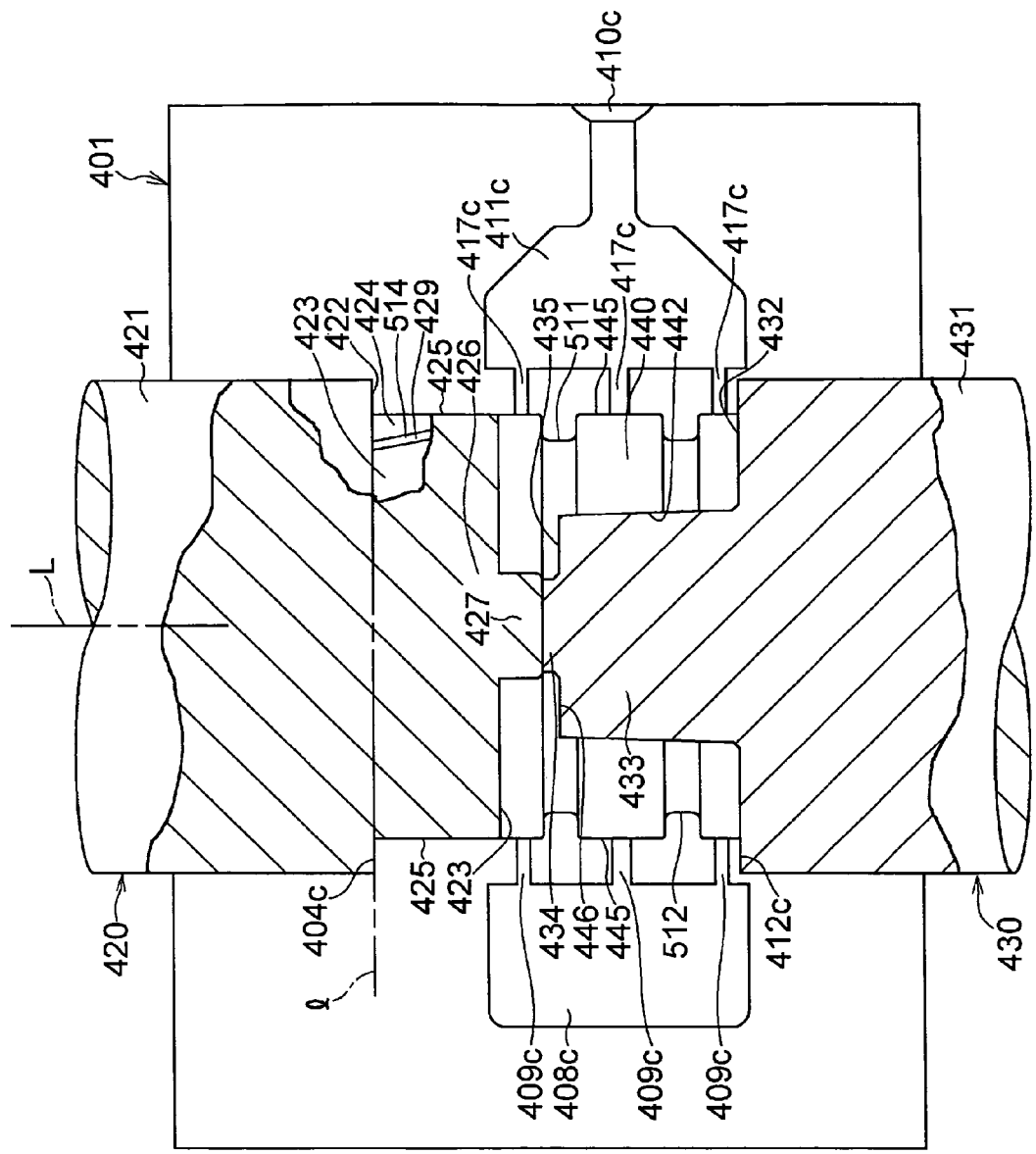
FIG. 19 is a cross-sectional view illustrating the hollow portion formed in the die shown in FIG. 17.
Figure 20:
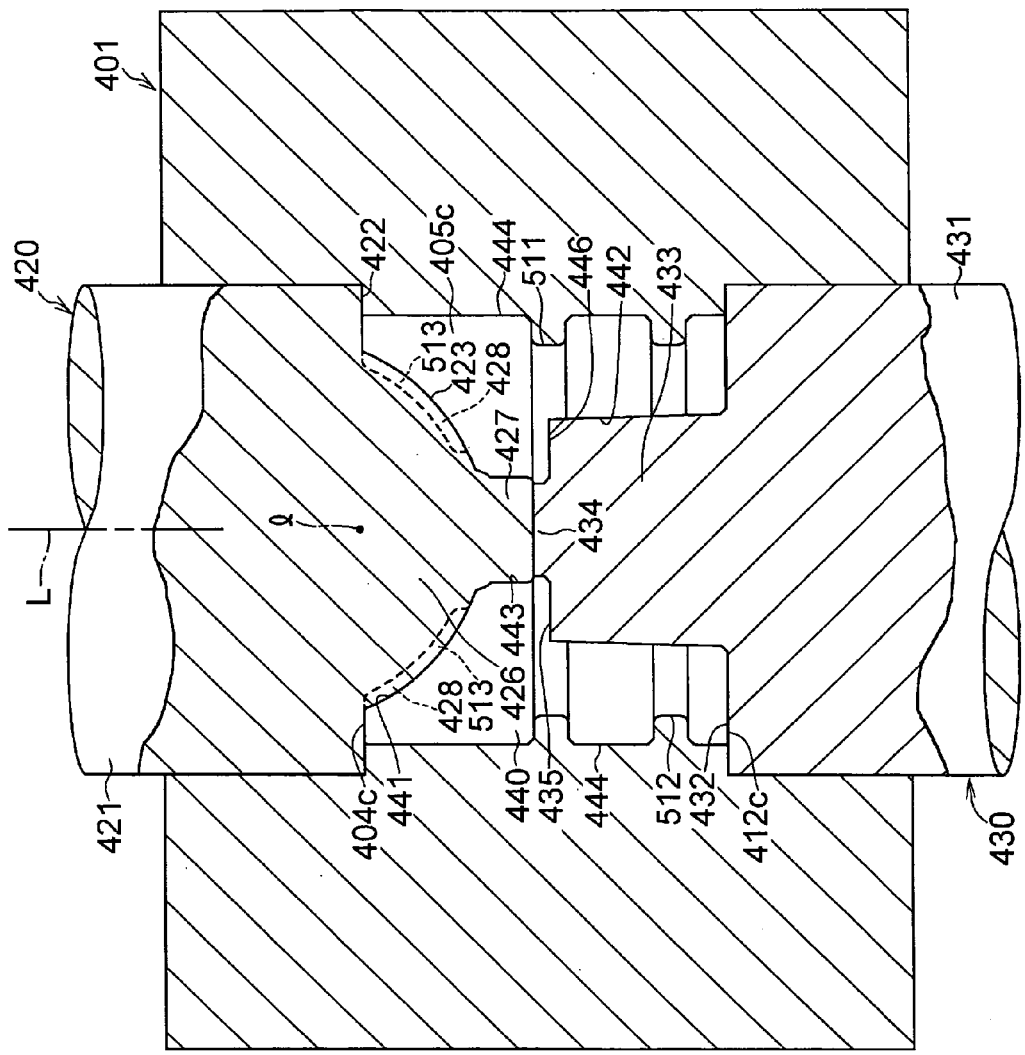
FIG. 20 is a cross-sectional view illustrating the hollow portion formed in the die shown in FIG. 17.

As particularly shown in FIGS. 19 and 20, a movable die 420 is inserted in the cylindrical hollow portion 403c of the die 401. The movable die 420 has a circular cylindrical portion 421 of a shape complementary to the cylindrical hollow portion 403c, a circular arc-shaped projecting portion 426, and a circular cylindrical projecting portion 427 formed integrally on a central portion of the circular arc-shaped projecting portion 426. The circular arc-shaped projecting portion 426 is formed integrally on one end face of the circular cylindrical portion 421 by leaving a planar portion 422 around its peripheral edge, and its outer surface is formed into a circular arc-shaped convexly projecting surface 423 about the axis 1 perpendicular to the axis L of the circular cylindrical portion 421. Both end faces of the circular arc-shaped projecting portion 426 respectively have cylindrical surfaces 424 and planar surfaces 425 which are of a shape complementary to the semicylindrical concave surfaces 405a and 405b and the planar surfaces 406a, 406b and 407a, 407b defining the substantially cylindrical hollow portion 405c of the die 401. The movable die 420 further has a pair of (two pairs of on both sides) narrow-width recessed portions 428 and 429 respectively extending from vicinities of the bottom of the convexly projecting surface 423 to the apex surfaces of the convexly projecting surface 423 along edge portions on both sides, as viewed in the direction of the axis 1, of the convexly projecting surface 423 of the circular arc-shaped projecting portion 426. The movable die 420 is inserted such that the planar portion 422 abuts against the annular stepped portion 404c of the die 1, and the circular arc-shaped projecting portion 426 is located in the substantially cylindrical hollow portion 405c.

As particularly shown in FIGS. 19 and 20, a movable die 330 is inserted in the cylindrical hollow portion 413c. The movable die 430 has a circular cylindrical portion 431 of a shape complementary to the cylindrical hollow portion 413c, a circular cylindrical projecting portion 433 formed integrally on one end face of the circular cylindrical portion 431 by leaving an annular planar portion 432 around its peripheral edge, and a circular cylindrical projecting portion 434 formed integrally on a central portion of an end face of that circular cylindrical projecting portion 433 by leaving an annular planar portion 435. The movable die 430 is inserted such that the planar portion 432 abuts against the annular stepped portion 412c of the die 401, the circular cylindrical projecting portion 434 abuts against an end face of the circular cylindrical projecting portion 427, and the circular cylindrical projecting portion 433 is located in the substantially cylindrical hollow portion 405c.

A cavity 440 is formed in the die 401 by means of the die 401 consisting of the lower die half 401a and the upper die half 401b as well as the movable die 420 and the movable die 430. The cavity 440 is provided with the following: a pair of semicylindrical convex surfaces 444 (corresponding to portions of the semicylindrical concave surfaces 405a and 405b); a pair of planar surfaces 445 (corresponding to portions of the planar surfaces 406a, 407a and 406b, 407b) each located between the pair of semicylindrical convex surfaces 444 and opposed to each other; a circular arc-shaped concavely recessed surface 441 (corresponding to the convexly projecting surface 423) located on one axial end portion side inwardly of the pair of semicylindrical convex surfaces 444 and the planar surfaces 445; and a cylindrical surface 442 (corresponding to an outer peripheral cylindrical surface of the circular cylindrical projecting portion 433) located on the other axial end portion side inwardly of the pair of semicylindrical convex surfaces 444 and the planar surfaces 445. The cavity 440 is further provided with a cylindrical surface 443 (corresponding to outer peripheral cylindrical surfaces of the circular cylindrical projecting portions 427 and 434) which is connected at its one end to a center of the bottom of the concavely recessed surface 441 on the other axial end portion side, is located inwardly of the pair of semicylindrical convex surfaces 444 and the planar surfaces 445, and has a smaller diameter than the cylindrical surface 442; and an annular surface 446 (corresponding to the planar portion 435) which is connected at its inner peripheral end to the other end of the small-diameter cylindrical surface 443 and is connected at its outer peripheral end to one end of the cylindrical surface 442; two rows of semi-annular recessed portions 511 and 512 (corresponding to the projection 501a and the projection 501b as well as the projection 502a and the projection 502b) respectively provided in the pair of semicylindrical convex surfaces 444 and the pair of planar surfaces 445 at positions offset in the axial direction from the concavely recessed surface 441 toward the cylindrical surface 442 side and communicating with each other; and narrow-width protruding portions 513 and 514 (corresponding to the recessed portions 428 and 429) respectively extending from vicinities of the bottom of the concavely recessed surface 441 to the apex surfaces of the concavely recessed surface 441 along edge portions on both sides of the concavely recessed surface 441, the mutually opposing pair of planar surfaces 445 being connected to respective ends of the bottom of the concavely recessed surface 441. Further formed in the die 401 are the hollow portion 411c with a rectangular cross section which has one end communicating with the cavity 440 through the three hollow branch portions 417c constituting runner channels for communicating with the cavity 440 and the other end communicating with the hollow portion 410c, the hollow portion 411c forming a runner channel for allowing the hollow portion 410c to communicate with the cavity 440 at one planar surface 445; and the three hollow portions 409c with a rectangular cross section each of which has one end communicating with the cavity 440 and the other end communicating with the hollow portion 408c constituting the overflow well, the hollow portions 409c forming runner channels for allowing the hollow portion 408c to communicate with the cavity 440 at the other planar surface 445. The three branch hollow portions 417c of the hollow portion 411c constituting the runner channel allow the cavity 440 to communicate with the hollow portion 410c at a plurality of, in this example three, portions separated with respect to the axial direction by the semi-annular recessed portions 511 and 512 at one planar surface 445. Meanwhile, the three branch hollow portions 409c of rectangular cross sections constituting the runner channels allow the cavity 440 to communicate with the hollow portion 408c at a plurality of, in this example three, portions separated with respect to the axial direction by the recessed portions 511 and 512 at the other planar surface 445.

In addition, molten metal of such as aluminum is forced into the cavity 440 through the hollow portion 410c serving as the gate, so as to effect die casting.

Figure 21:
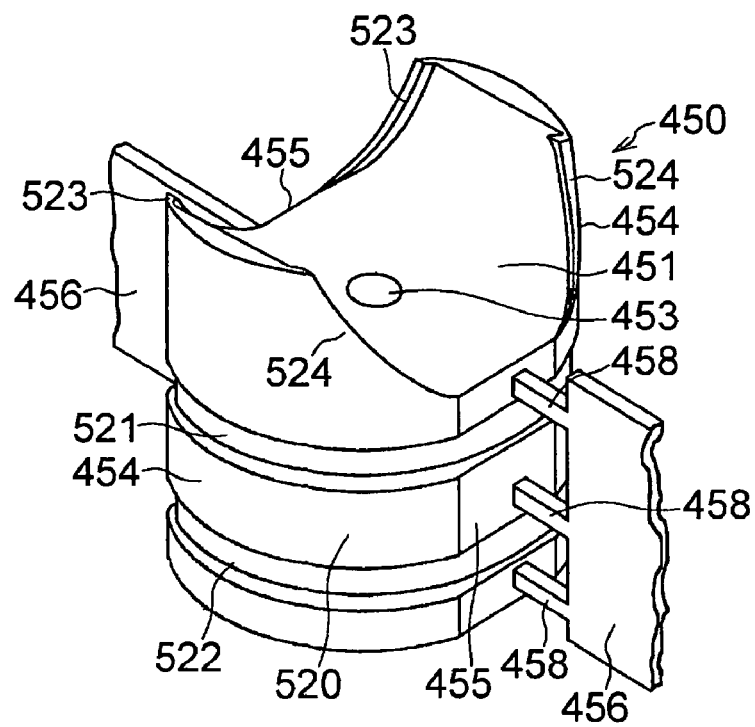
FIG. 21 is a perspective view illustrating another rack guide base body after die casting.

FIG. 21 shows a rack guide base body 450 removed from the die 401 after die casting. The rack guide base body 450 of this example has on its outer peripheral surface a pair of semicylindrical surfaces 454 and a pair of planar surfaces 455 each located between the pair of semicylindrical surfaces 454. The rack guide base body 450 further has a circular arc-shaped concavely recessed surface 451 located on one axial end portion side inwardly of the pair of semicylindrical surfaces 454 and the planar surfaces 455; a cylindrical surface 452 (see FIG. 22) located on the other axial end portion side inwardly of the pair of semicylindrical surfaces 454 and the planar surfaces 455; and a circular hole 453 (a through hole in this example) located in the center of the bottom of the concavely recessed surface 451. Still further, the rack guide base body 450 has two mutually parallel annular grooves 521 and 522 in an outer peripheral surface 520 formed by the pair of semicylindrical surfaces 454 and the pair of planar surfaces 455, as well as narrow-width protruding portions 523 and 524 respectively extending from vicinities of the bottom of the concavely recessed surface 451 to the apex surfaces of the concavely recessed surface 451 along edge portions on both sides of the concavely recessed surface 451. Furthermore, a pair of runners 456 each having three-fork portions 458 are respectively joined to the planar surfaces 455 connected to respective ends of the bottom of the concavely recessed surface 451 and located in such a manner as to oppose each other.

The rack guide base body 450 for use in the rack-and-pinion type steering apparatus is formed as the three-fork portions 458 of the pair of runners 456 joined integrally to the planar surfaces 455 are cut off along the planar surfaces 455 at positions which do not project from the phantom circle defined by the semicylindrical surfaces 454 at the outer peripheral surface 520.

The cut remnants of the three-fork portions 458 of the runners 456 at the planar surfaces 455 of the rack guide base body 450 do not project from the phantom circle 57 defined by the semicylindrical surfaces 454 at the outer peripheral surface 520. Therefore, even with a very small gap of 1 to 20 µm set between the semicylindrical surface 454 at the outer peripheral surface 520 of the rack guide base body 450 and the inner peripheral surface 75 of the cylindrical housing 71 of the rack-and-pinion type steering apparatus where the rack guide base body 450 is disposed, it is unnecessary to separately remove the cut remnants the respective three-fork portions of the runners 456 and effect machining for the entire outer peripheral surface 520 of the rack guide base body 450. Since the rack guide base body 450 can be disposed as die cast, it is possible to substantially reduce the cost required for machining the entire outer peripheral surface of the rack guide base body 450. As a result, this permits a reduction in the manufacturing cost of the rack guide.

Figure 22:
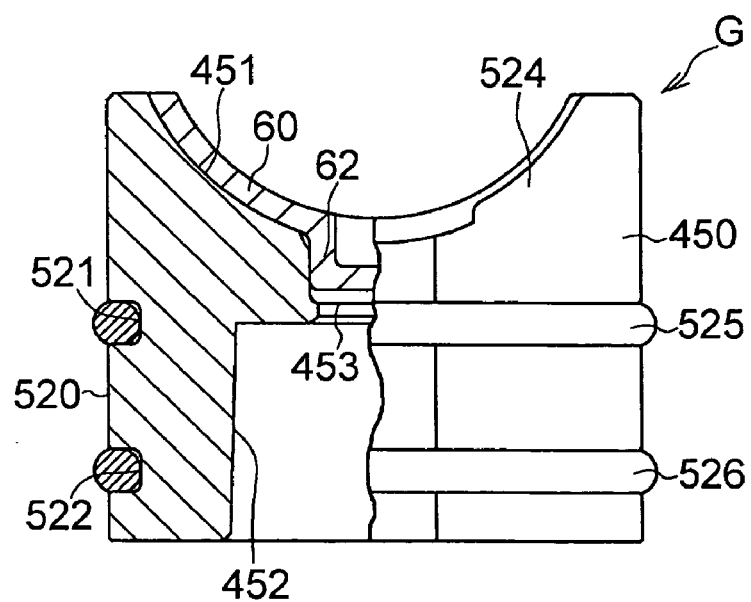
FIG. 22 is a cross-sectional view of another rack guide.

As shown in FIG. 22, in the same way as described above, the slider 60 is seated on the concavely recessed surface 451 of the rack guide base body 450 such that the engaging projection 62 is fitted in the hole 453 formed in the center of the concavely recessed surface 451 of the rack guide base body 450, and is positioned by the projecting portions 523 and 524, thereby securing the slider 60 to the rack guide base body 450. At the same time, the rack guide G is formed in which elastic rings 525 and 526 are respectively fitted in the annular grooves 521 and 522 in such a manner as to partially project from the outer peripheral surface 520 to the outside.

In the same way as described above, the rack guide G shown in FIG. 22 is accommodated in the cylindrical housing 71 in the rack-and-pinion type steering apparatus 70 shown in FIG. 10. With the rack guide G in which the elastic rings 525 and 526 are fitted, the elastic rings 525 and 526 instead of the outer peripheral surface 520 are slidably brought into contact with the inner peripheral surface 75 of the cylindrical housing 71, and are capable of producing such a necessary and sufficient gap between the outer peripheral surface 520 and the inner peripheral surface 75 that does not causing a swinging motion in the rack guide G. Thus, it is possible to prevent a so-called "metal of similar composition" which is likely to occur between the two members of the rack guide base body 450 and the cylindrical housing 71. Further, it is possible to overcome the problem that the movement of the rack guide G toward the rack bar is hampered by an increase in the frictional resistance and the occurrence of adhesive wear accompanying such a "metal of similar composition." Consequently, it becomes possible to allow the movement of the rack guide G with respect to the rack bar 74 to be effected smoothly. Moreover, even if wheel vibrations are transmitted to the rack guide G, the rack guide G is prevented from rattling with respect to the cylindrical housing 71. It is therefore possible to prevent the hammering sound of the rack guide base body 450 with respect to the inner peripheral surface 75 of the cylindrical housing 71. Furthermore, even if a force acting in a direction perpendicular to the moving direction of the rack teeth 73 has been applied to the rack teeth 73 during the steering of the steering wheel, it is possible to prevent the vertical movement, i.e., jerky movement, of the rack guide G.

Figure 23:
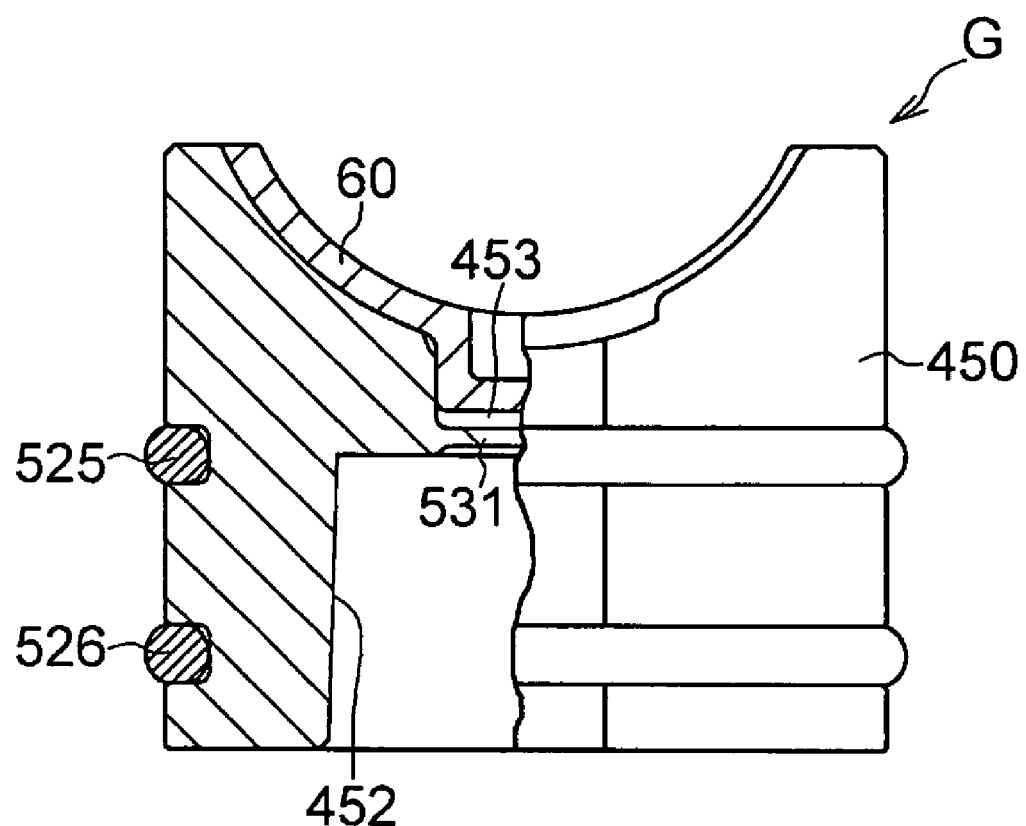
FIG. 23 is a cross-sectional view of still another rack guide.

Although in the foregoing description the hole 53 or 453 is formed as the through hole by the circular cylindrical projecting portion 27 or 427 and the circular cylindrical projecting portion 33 or 433 which abut against each other, as shown in FIG. 23, the hole 453 may be formed as a hole with a bottom closed by a bottom wall portion 531 by means of the circular cylindrical projecting portion 427 and the circular cylindrical projecting portion 433 which do not abut against each other.

The invention claimed is:

1. A rack guide comprising:
    a rack guide base body having a pair of semicylindrical outer peripheral surfaces extending parallel to an axial direction transverse to a direction of movement of a rack bar, a pair of planar outer peripheral surfaces extending parallel to said axial direction and each located between the pair of semicylindrical outer peripheral surfaces, one axial end surface including a recessed surface located radially inwardly of the pair of semicylindrical outer peripheral surfaces and the planar outer peripheral surfaces, and another axial end surface including a cylindrical surface located radially inwardly of the pair of semicylindrical outer peripheral surfaces and the planar outer peripheral surfaces; and
    a slider secured to said recessed surface of said rack guide base body.

2. The rack guide according to claim 1, wherein said recessed surface includes a circular-arc shaped recessed surface.

3. The rack guide according to claim 1, wherein said recessed surface includes a pair of mutually opposing planar surfaces and a pair of inclined surfaces respectively extending integrally from the pair of planar surfaces of said recessed surface.

4. The rack guide according to claim 1, wherein said rack guide base body has a hole in a center of a bottom of the recessed surface, and said slider has a projecting portion which is fitted in the hole of said rack guide base body.

5. The rack guide according to claim 4, wherein the hole includes a through hole or a hole with a bottom.

6. The rack guide according to claim 1, wherein the pair of planar outer peripheral surfaces are connected to respective ends of the bottom of the recessed surface and are located in such a manner as to oppose each other.

7. The rack guide according to claim 1, wherein said rack guide base body has at least one annular groove in the pair of semicylindrical outer peripheral surfaces and the pair of planar outer peripheral surfaces.

8. The rack guide according to claim 7, further comprising an elastic ring fitted in the annular groove in such a manner as to partially project from the pair of semicylindrical outer peripheral surface to an outside of the same.

9. The rack guide according to claim 1, wherein said rack guide base body has at least two rows of annular grooves in the pair of semicylindrical outer peripheral surfaces and the pair of planar outer peripheral surfaces.

10. The rack guide according to claim 9, further comprising elastic rings fitted in the annular grooves in such a manner as to partially project from the pair of semicylindrical outer peripheral surface to an outside of the same, respectively.

11. The rack guide according to claim 1, wherein said rack guide base body has narrow-width protruding portions respectively extending from vicinities of the bottom of the recessed surface to apex surfaces of the recessed surface along edge portions on both sides of the recessed surface.

* * * * *

UNITED STATES PATENT AND TRADEMARK OFFICE
CERTIFICATE OF CORRECTION

PATENT NO. : 7,275,456 B2 Page 1 of 1
APPLICATION NO. : 10/534413
DATED : October 2, 2007
INVENTOR(S) : Yamamoto et al.

It is certified that error appears in the above-identified patent and that said Letters Patent is hereby corrected as shown below:

On the Title Page, Item (54) should read
(54)   METHOD OF MANUFACTURING RACK GUIDE BASE BODY IN RACK-AND-PINION TYPE STEERING APPARATUS AND RACK GUIDE Signed and Sealed this Sixteenth Day of December, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,275,456 B2 |
| APPLICATION NO. | : 10/534413 |
| DATED | : October 2, 2007 |
| INVENTOR(S) | : Yamamoto et al. |

It is certified that error appears in the above-identified patent and that said Letters Patent is hereby corrected as shown below:

On the Title Page, Item (54) and Column 1, lines 1-3, should read
(54)   METHOD OF MANUFACTURING RACK GUIDE BASE BODY IN RACK-AND-PINION TYPE STEERING APPARATUS AND RACK GUIDE This certificate supersedes the Certificate of Correction issued December 16, 2008.

Signed and Sealed this

Sixth Day of January, 2009

JON W. DUDAS
*Director of the United States Patent and Trademark Office*